US011622427B2

(12) United States Patent
Chitta et al.

(10) Patent No.: US 11,622,427 B2
(45) Date of Patent: Apr. 4, 2023

(54) MULTI-CHANNEL LIGHTING FIXTURE HAVING MULTIPLE LIGHT-EMITTING DIODE DRIVERS

(71) Applicant: Lutron Technology Company LLC, Coopersburg, PA (US)

(72) Inventors: Venkatesh Chitta, Bethlehem, PA (US); Arya Abraham, Center Valley, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/699,878

(22) Filed: Mar. 21, 2022

(65) Prior Publication Data

US 2022/0210883 A1    Jun. 30, 2022

Related U.S. Application Data

(63) Continuation of application No. 16/983,687, filed on Aug. 3, 2020, now Pat. No. 11,284,485, which is a
(Continued)

(51) Int. Cl.
*H05B 33/00* (2006.01)
*H05B 45/20* (2020.01)
(Continued)

(52) U.S. Cl.
CPC ........... *H05B 45/20* (2020.01); *G05B 19/102* (2013.01); *H05B 47/155* (2020.01); *H05B 47/175* (2020.01); *G05B 2219/23172* (2013.01)

(58) Field of Classification Search
CPC ......... H01L 2924/0002; H01L 2924/00; H01L 23/576; H01L 2224/48091; H01L 2924/13091; H01L 2924/00014; H01L 2924/1461; H01L 21/02532; H01L 21/02686; H01L 21/76254; H04N 1/32587; G01J 3/28
USPC ....... 315/291, 312, 294, 292, 316, 362, 152, 315/158, 308, 149, 70, 297, 307, 318, 315/324, 153, 185 S, 201, 313, 134, 150, 315/154, 155, 161, 247, 295, 302, 309,
(Continued)

(56) References Cited

U.S. PATENT DOCUMENTS 8,009,042 B2    8/2011  Steiner et al.
8,199,010 B2    6/2012  Sloan et al.
(Continued)

FOREIGN PATENT DOCUMENTS

CN    101911835 A    12/2010
WO    2009090601 A1   7/2009
WO    2013101766 A1   7/2013

*Primary Examiner* — Monica C King
(74) *Attorney, Agent, or Firm* — Michael Czarnecki; Philip Smith; Glen Farbanish

(57) ABSTRACT

A lighting control system for controlling a cumulative light emitted by a lighting fixture having a plurality of LED light sources may comprise a plurality of LED drivers adapted to be coupled to a respective one of the LED light sources and configured to control an intensity of the respective LED light source, and a controller configured to transmit a single digital message for controlling the cumulative light emitted by the lighting fixture. Each of the plurality of LED drivers is configured to adjust the intensity of the respective LED light source to a preset intensity in response to the single digital message transmitted by the controller.

18 Claims, 14 Drawing Sheets

Related U.S. Application Data continuation of application No. 16/572,503, filed on Sep. 16, 2019, now Pat. No. 10,736,193, which is a continuation of application No. 16/105,656, filed on Aug. 20, 2018, now Pat. No. 10,420,187, which is a continuation of application No. 15/869,653, filed on Jan. 12, 2018, now Pat. No. 10,057,958, which is a continuation of application No. 14/975,070, filed on Dec. 18, 2015, now Pat. No. 9,888,543.

(60) Provisional application No. 62/094,703, filed on Dec. 19, 2014.

(51) Int. Cl.
  *H05B 47/155* (2020.01)
  *H05B 47/175* (2020.01)
  *G05B 19/10* (2006.01)

(58) Field of Classification Search
  USPC ........ 315/314, 317, 32, 360, 368.23, 49, 50, 315/77, 82; 362/235, 249.02, 800, 234, 362/233, 242, 84, 85, 227, 231, 240, 241, 362/253, 311.02, 317, 236, 238, 243, 245, 362/249.01, 249.04, 257, 259, 268, 277, 362/293, 294, 296.07, 302, 311.06, 318, 362/319, 322, 327, 362, 363, 375, 382, 362/464, 466, 489, 509, 545, 612, 615, 362/623, 631, 89
  See application file for complete search history.

(56) References Cited

U.S. PATENT DOCUMENTS

| | | |
|---|---|---|
| 8,228,184 B2 | 7/2012 | Blakeley et al. |
| 8,410,706 B2 | 4/2013 | Steiner et al. |
| 8,451,116 B2 | 5/2013 | Steiner et al. |
| 8,456,109 B1 | 6/2013 | Wray |
| 8,492,987 B2 | 7/2013 | Nuhfer et al. |
| 8,581,520 B1 | 11/2013 | Wray |
| 8,742,695 B2 | 6/2014 | Wray |
| 8,810,159 B2 | 8/2014 | Nuhfer et al. |
| 9,888,543 B2 | 2/2018 | Chitta et al. |
| 10,057,958 B2 | 8/2018 | Chitta et al. |
| 10,420,187 B2 | 9/2019 | Chitta et al. |
| 10,736,193 B2 | 8/2020 | Chitta et al. |
| 2011/0187290 A1 | 8/2011 | Krause |
| 2014/0009085 A1 | 1/2014 | Veskovic |
| 2014/0265568 A1 | 9/2014 | Crafts et al. |
| 2014/0265880 A1 | 9/2014 | Taipale et al. |
| 2014/0312777 A1 | 10/2014 | Shearer et al. |
| 2016/0232774 A1 | 8/2016 | Noland et al. |
| 2017/0001977 A1 | 1/2017 | Dilhas et al. |
| 2018/0168019 A1 | 6/2018 | Baker et al. |

MULTI-CHANNEL LIGHTING FIXTURE HAVING MULTIPLE LIGHT-EMITTING DIODE DRIVERS

CROSS-REFERENCE TO RELATED APPLICATIONS

This application is a continuation of U.S. patent application Ser. No. 16/983,687 filed Aug. 3, 2020; which is a continuation of U.S. patent application Ser. No. 16/572,503 filed Sep. 16, 2019 (now U.S. Pat. No. 10,736,193, issued Aug. 4, 2020); which is a continuation of U.S. patent application Ser. No. 16/105,656, filed on Aug. 20, 2018 (now U.S. Pat. No. 10,420,187, issued Sep. 17, 2019); which is a continuation of U.S. patent application Ser. No. 15/869,653, filed on Jan. 12, 2018 (now U.S. Pat. No. 10,057,958, issued Aug. 21, 2018); which is a continuation of U.S. patent application Ser. No. 14/975,070, filed Dec. 18, 2015 (now U.S. Pat. No. 9,888,543, issued on Feb. 6, 2018); which claims the benefit of U.S. Provisional Patent Application No. 62/094,703, filed Dec. 19, 2014, the entire disclosures of which are incorporated by reference herein.

BACKGROUND

Traditional sources of light such as the sun (and later incandescent lights) may exhibit the characteristics of a black body radiator. Such light sources typically emit a relatively continuous-spectrum of light, and the continuous emissions range the entire bandwidth of the visible light spectrum (e.g., light with wavelengths between approximately 390 nanometers (nm) and 700 nm). The human eye has grown accustomed to operating in the presence of black body radiators and has evolved to be able to distinguish a large variety of colors when emissions from a black body radiator are reflected off of an object of interest.

Further, the frequency or wavelength of the continuous light spectrum emitted by a black body radiator may be dependent on the temperature of the black body radiator. Plank's law states that a black body radiator in thermal equilibrium will emit a continuous-spectrum of light that is dependent on the equilibrium temperature of the black body. FIG. 1 illustrates the black body temperature curve (e.g., color map) according to Plank's law. As shown in FIG. 1, as the temperature of the black body radiator increases, the frequency of the peak of the emitted spectrum shifts to higher frequencies. At room temperature (e.g., roughly 300 Kelvin (K)), the frequency peak is typically within the infrared portion of the spectrum and thus is imperceptible to the human eye. However, when the temperature is increased to approximately 700-750 K, the blackbody radiator will begin to emit light in the visible range of the electromagnetic spectrum.

Typically, as the temperature of the black body radiator decreases, the wavelength of the emitted light increases and the frequency decreases, such that the emitted light appears redder. As the temperature increases, the peak of the emitted spectrum become bluer or decreases in wavelength (e.g., increases in frequency). For black body radiators, this relationship between temperature and wavelength/frequency of the emitted light is inseparable—higher temperature radiators appear bluer and lower temperature radiators appear redder.

Thus, various wavelengths/frequencies of the visible light spectrum may be associated with a given color temperature of a black body radiator. The color temperature of a light source may refer to the temperature of an ideal black body radiator that radiates light of comparable hue to that of the light source. For example, candlelight, tungsten light (e.g., from an incandescent bulb), early sunrise, and/or household light bulbs may appear to have relatively low color temperatures, for example on the range of 1,000-3,000 K. Noon daylight, direct sun (e.g., sunlight above the atmosphere), and/or electronic flash bulbs may appear to have color temperature values on the order of 4,000-5,000 K and may have a greenish blue hue. An overcast day may appear to have a color temperature of approximately 7,000 K and may be even bluer than noon daylight. North light may be bluer still, appearing to have a color temperature on the range of 10,000 K. Color temperatures over 5,000 K are often referred to as cool colors (e.g., bluish white to deep blue), while lower color temperatures (e.g., 2,700-3,000 K) are often referred to as warm colors (e.g., red through yellowish white).

Incandescent and halogen lamps typically act as black body radiators. For example, a current is passed through a wire (e.g., a filament), causing the wire to increase in temperature. When the wire reaches a critical temperature, it begins to radiate light in the visible spectrum. The color temperature of the radiated light is dictated by Plank's law. When an incandescent or halogen light is dimmed, the temperature (and color temperature) is decreased, meaning that the emitter light becomes redder (e.g., higher wavelength, lower frequency). Thus, humans are accustomed to dimmed lights having a redder hue.

Recently, non-incandescent light sources such as fluorescent lights (e.g., compact fluorescent lights or CFLs) and light emitting diodes (LEDs) have become more widely available due to their relative power savings as compared to traditional incandescent lamps. Typically light from CFLs or LEDs does not exhibit the properties of a black body radiator. Instead, the emitted light is often more discrete in nature due to the differing mechanisms by which CFLs and/or LEDs generate light as compared to an incandescent or Halogen light bulbs. Since fluorescents and LEDs do not emit relatively constant amounts of light across the visible light spectrum (e.g., instead having peaked intensities at one or more discrete points within the visible spectrum), fluorescents and LEDs are often referred to as discrete-spectrum light sources.

The wavelength/frequency profile of a light source may be dependent on the device or technique used to generate the light. For example, light from fluorescent lamps is produced by electrically exciting mercury within a glass tube. The applied voltage causes the mercury to become a plasma that emits light in the ultraviolet (UV) frequency range. Typically, the glass tube is coated with a phosphorus-based material that absorbs the radiated UV light and then emits light in the visible frequency range. The wavelength shift from UV to the visible range is referred to as Stokes shift. Depending on the properties of the phosphorus-based material, the wavelength/frequency of the light emitted may be at different points within the visible spectrum. A CFL lamp may emit a discrete spectrum of light, which may be characterized by one or more bursts of emissions at discrete frequencies/wavelengths.

Light from LEDs is produced due to the physical properties of a semiconducting material. For example, when a voltage is applied across a semiconductor junction that has different levels of electron doping across the boundary, an electric current is induced. When an electron from one side of the device recombines with an electron hole on the other, a photon is emitted. Depending on the semiconductor design, the photons may be emitted at various wavelengths/ frequencies within the visible light spectrum. Like fluorescents, Stokes shift may cause the frequency of the emitted photons to be lowered to achieve a desired light frequency output. Like the emissions from the fluorescent lamp, the LED light may also be relatively discrete in nature (e.g., a discrete spectrum).

When discrete-spectrum light sources are dimmed, their color temperature may change in a different manner as black body radiators. For example, when incandescents and halogens are dimmed, their temperature is decreased and the emitted light transitions to a lower color temperature value (e.g., becomes redder) according to Plank's law. However, since discrete-spectrum light sources are not black body radiators, Plank's law may not apply. For example, both fluorescent lamps and LEDs may maintain a relatively constant color temperature even in the presence of dimming (e.g., and may actually become slightly bluer or higher frequency as they are dimmed). Such an effect may be unnatural to the human eye, which may expect the color temperature to shift to a redder temperature as the light dims. Moreover, when discrete-spectrum light sources are placed in the vicinity of other light sources, for example sources of light whose color temperature may change over time, the discrete-spectrum light sources can appear unnatural or distracting.

SUMMARY

As described herein, a lighting control system for controlling a cumulative light emitted by a lighting fixture having a plurality of LED light sources may comprise a plurality of LED drivers adapted to be coupled to a respective one of the LED light sources and configured to control an intensity of the respective LED light source, and a controller configured to transmit a single digital message for controlling the cumulative light emitted by the lighting fixture. Each of the plurality of LED drivers is configured to adjust the intensity of the respective LED light source to a preset intensity in response to the single digital message transmitted by the controller.

In addition, a controller for controlling a cumulative light emitted by a lighting fixture is also described herein. The lighting fixture may include a plurality of LED light sources and a plurality of respective LED drivers. The controller may comprise a communication circuit configured to transmit digital messages via a digital communication link, and a control circuit configured to cause the communication circuit to transmit a single digital message on the communication link. The single digital message may include a command for causing the plurality of LED drivers to adjust the intensity of the respective LED light sources to respective preset intensities to control the cumulative light emitted by the lighting fixture.

A control module for controlling a cumulative light emitted by a lighting fixture may comprise a first communication circuit configured to receive a digital message via a digital communication link, a second communication circuit adapted to be electrically coupled to a plurality of LED drivers for controlling respective LED light sources, a memory configured to store a light engine defining preset intensities for the LED light sources, and a control circuit configured to control the plurality of LED drivers to adjust the intensity of the respective LED light sources to respective preset intensities to control the cumulative light emitted by the lighting fixture in response to a single digital message via the digital communication link.

A master LED driver for controlling a cumulative light emitted by a lighting fixture may comprise a load regulation circuit adapted to be coupled to a first LED light source and configured to control the intensity of the first LED light source, a first communication circuit configured to receive a digital message via a digital communication link, a second communication circuit adapted to be electrically coupled to a slave LED driver for controlling a second LED light source, and a control circuit configured to control the load regulation circuit to adjust the intensity of the first LED light source and to control the slave LED driver to adjust the intensity of the second LED light source to control the cumulative light emitted by the lighting fixture in response to a single digital message via the digital communication link.

Further, a method of configuring at least first and second LED drivers to be installed in a single lighting fixture is described herein. The lighting fixture may include at least first and second LED light sources adapted to be controlled by the respective LED drivers to control a cumulative light emitted by the lighting fixture. The method may comprise: storing a first light engine in a first memory of the first LED driver, the first light engine defining preset intensities for the first LED light source; and storing a second light engine in a second memory of the second LED driver, the second light engine defining preset intensities for the second LED light source. The first and second LED drivers may be configured to control the cumulative light emitted by the lighting fixture in response to a single received digital message by adjusting the intensities of the respective LED light sources to respective preset intensities determined from the respective light engines. The first and second LED light sources comprise different color LED light sources and the first and second light engines comprise respective first and second color engines. The method may also comprise installing in the first and second LED light sources and first and second LED drivers in the lighting fixture, and adjusting the first and second color engines to calibrate a color (e.g., a color temperature) of the cumulative light emitted by the lighting fixture.

DETAILED DESCRIPTION

Figure 1:
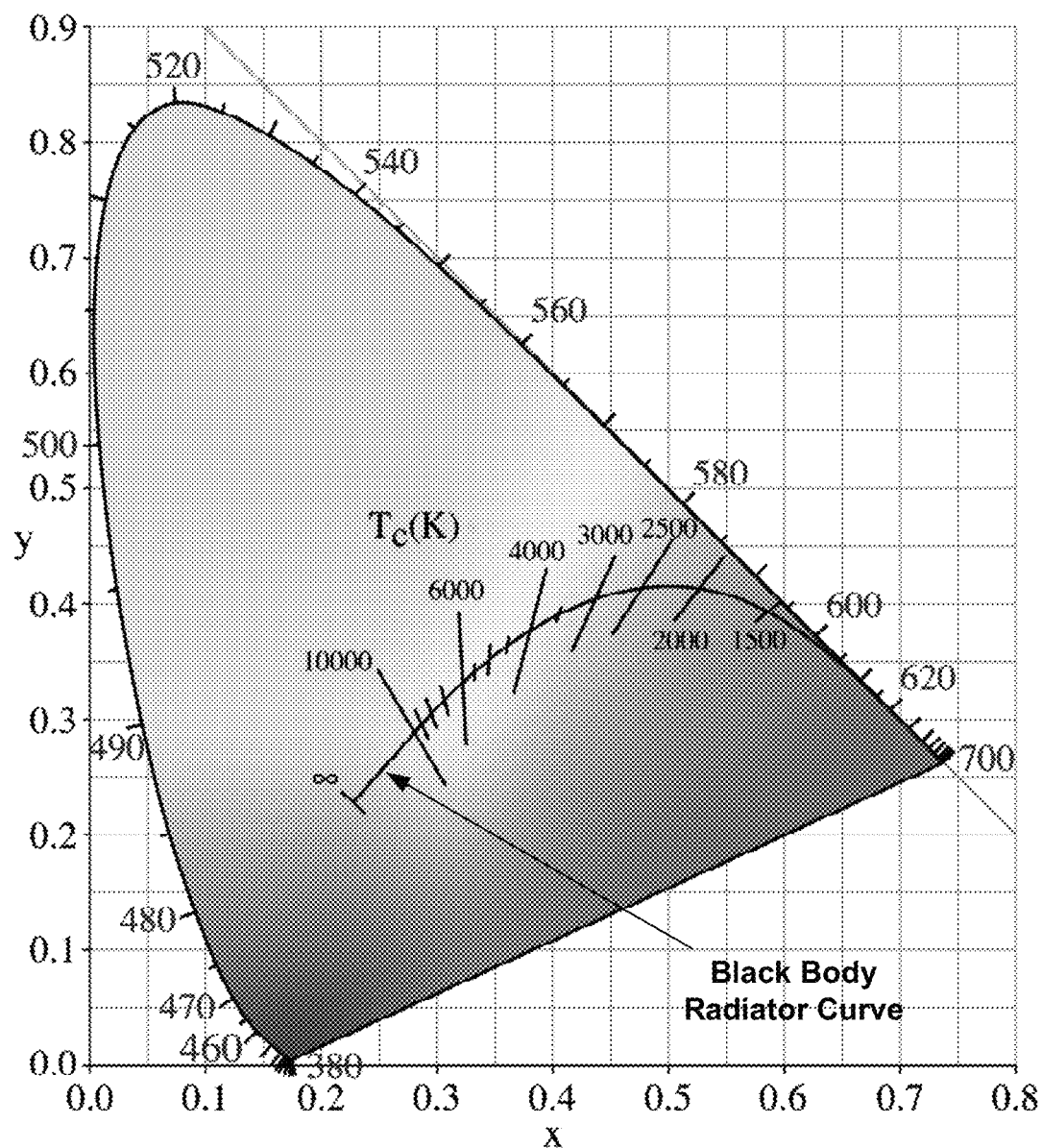
FIG. 1 depicts an example of the black body color temperature curve according to Plank's law.

The various systems and methods described herein for shifting a light source to a higher wavelength/lower frequency. Such systems and methods may describe the changing the effective or composite color (e.g., color temperature) of a light source to a lower color (e.g., color temperature). The effective or composite color (e.g., color temperature) of a light source may be changed to a higher color (e.g., color temperature) by shifting the light source to a lower wavelength/higher frequency. Although color temperature may be described herein as an example for adjusting the color of a light source, other parameters (e.g., hue, saturation, etc.) may be used to adjust color characteristics of a light source.

There may be numerous ways for shifting the color (e.g., the color temperature) of a discrete-spectrum light source. For example, two or more discrete-spectrum light sources may be controlled to vary the effective color temperature of a combined or composite light emitted from the two or more discrete-spectrum light sources (e.g., the correlated color temperature). A composite light or combined light emitted from two or more light sources may include a mixed or joint emissions of light as seen from an observer at a distance away from the light source. For example, the light sources may be included in a single light fixture, and to an observer in a room that includes the fixture the composite light emitted by the two or more light sources may appear to be from as a single light source. The light fixture may or may not include a diffuser or other instrument that makes the composite light emitted from the two or more discrete-spectrum light sources appear to be emitted from a single light source.

Although a first light source may be included in a different lighting fixture than a second light source, the two light sources may be located sufficiently close together from the perspective of an observer that their composite emissions appear to be from a single light source. The relative proximity of two or more light sources that emit composite or combined light emissions may vary depending on the position or distance of a desired target or observer of the composite light emissions. For example, the two or more light sources may be located relatively close together (e.g., in the same fixture) if the target or observer of the composite light is relatively close to the light sources (e.g., in the same room). If the target or observer is farther away, the two or more light sources may be separated by a relatively greater distance.

As noted above, the composite light may be the combined emissions of two or more discrete-spectrum light sources. One or more discrete-spectrum light sources may be used in combination with a continuous-spectrum light source such as an incandescent or halogen lamp. The composite light emitted from such a device may include the light emitted from the continuous-spectrum light source (e.g., and potentially multiple continuous-spectrum light sources) and the one or more discrete-spectrum light sources. Various combinations of discrete-spectrum light sources and continuous-spectrum light sources may be utilized.

Multiple discrete-spectrum light sources may be used to achieve various effective colors (e.g., color temperatures). For example, if a first discrete-spectrum light source has an effective color temperature in the red range (e.g., on the order of 1,000 to 2,000 K) and a second discrete-spectrum light source has an effective color temperature in the blue range (e.g., on the order of 10,000 K), then the total combined color temperature or composite color temperature of light emitted from the combination of the first discrete-spectrum light source and the second discrete-spectrum light source may be of greenish hue (e.g., on the order of 4,000-5,000 K) due to the human eye's perception of the composite light emitted by the two light sources. By utilizing more discrete-spectrum light sources emitting light associated with various color temperature values, more exact color temperature control may be achieved.

A first discrete-spectrum light source may maintain a constant intensity level, and an intensity level of a second discrete-spectrum light source may be varied (e.g., the intensity level may be increased, decreased, etc.). Increasing the intensity of the second discrete-spectrum light source may cause the composite color temperature (e.g., the correlated color temperature) of the light sources to become closer to that of the second discrete spectrum light source. Decreasing the intensity of the second discrete-spectrum light source may cause the composite color temperature (e.g., the correlated color temperature) of the light sources to become closer to that of the first discrete-spectrum light source.

The intensity levels of discrete-spectrum light sources may be varied to achieve a desired color (e.g., a desired color temperature value) for the composite emissions from the discrete-spectrum light sources. A system controller and/or the load control system that controls the intensity levels of the first and second discrete-spectrum light sources, for example, may maintain a state table or other information in system memory that associates a desired color for composite light emissions with intensity levels of the first and second light sources. Thus, the controlling device may be able to determine appropriate intensity levels for each of a plurality of discrete-light sources based on the desired color of the composite light emitted by the plurality of discrete-spectrum light sources.

In addition to the desired color of the composite light being used to select appropriate intensity levels of the discrete-spectrum light sources, the overall or combined intensity of the light may be used to select appropriate intensity levels for the underlying discreet-spectrum light sources. For example, in a light fixture that utilizes two-discrete spectrum light sources, a desired color temperature value for the composite light emitted by the light fixture may be achieved using various combinations of intensity levels of the first and second discrete-spectrum light sources. Although different combinations of intensity levels for the first and second discrete-spectrum light sources may be used to achieve approximately the same color temperature value of the composite emissions, the different combinations may result in different overall intensity levels of the composite light (e.g., the overall composite intensity may be dimmer for a first combination and brighter for a second combination). Thus, the system controller and/or the load control system that controls the intensity levels of the first and second discrete-spectrum light sources may determine the individual intensity levels of the first and second discrete-spectrum light sources based on both the desired color temperature value of the composite light and the desired overall intensity level of the composite light. Table 1 illustrates an example state table that may be maintained in order to determine appropriate intensity levels of the first and second discrete-spectrum light sources based on a desired color temperature value of the composite light and a desired overall intensity level of the composite light.

TABLE 1

| Desired Color Temperature Value of Composite Emissions (K) | Desired Intensity Level of Composite Emissions | Intensity Level of First Discrete-Spectrum Light Source | Intensity Level of Second Discrete-Spectrum Light Source |
|---|---|---|---|
| 8,000 | $L_{C1}$ | $L_{A1}$ | $L_{B1}$ |
| 4,000 | $L_{C1}$ | $L_{A2}$ | $L_{B2}$ |
| 2,000 | $L_{C1}$ | $L_{A3}$ | $L_{B3}$ |
| 8,000 | $L_{C2}$ | $L_{A4}$ | $L_{B4}$ |
| 4,000 | $L_{C2}$ | $L_{A5}$ | $L_{B5}$ |
| 2,000 | $L_{C2}$ | $L_{A6}$ | $L_{B6}$ |

In the example shown in Table 1, if the desired color temperature of emissions is approximately 8,000 K and the desired composite intensity level is $L_{C1}$, the first discrete-spectrum light source may be set to intensity level $L_{A1}$, and the second discrete-spectrum light source may be set to intensity level $L_{B1}$. As an example, such a composite color temperature and composite intensity level may correspond to the first discrete-spectrum light source operating at full intensity (e.g., $L_{A1}$=100%) and while the second-discrete spectrum light source operates at half intensity (e.g., $L_{B1}$=50%). If the color temperature is to be lowered to 4,000 K, but the overall composite intensity is to remain relatively constant, the first discrete-spectrum light source may be set to intensity level $L_{A2}$, and the second discrete-spectrum light source may be set to intensity level $L_{B2}$. In some instances, such a change in color temperature may be achieved by varying the intensity level of a single discrete-spectrum light source of the discrete-spectrum light sources. If the desired composite color temperature is to remain constant at 8,000 K, but the overall composite intensity level is to be changed (e.g., dimmed) to level $L_{C2}$, the first discrete-spectrum light source may be set to intensity level $L_{A4}$, and the second discrete-spectrum light source may be set to intensity level $L_{B4}$. For example, such a composite intensity level $L_{C2}$ at color temperature 8,000 K may correspond to the first discrete-spectrum light source operating at half intensity (e.g., $L_{A4}$=50%) and while the second discrete spectrum light source operates at quarter intensity (e.g., $L_{B4}$=25%).

Although the example described with respect to Table 1 utilizes two discrete spectrum light sources, similar relationships may be determined for systems utilizing more than two discrete-spectrum light sources. For example, by utilizing more than two discrete-spectrum light sources higher degrees of granularity may be achieved for adjusting one or more of the desired color temperature value of the composite emissions and/or the desired intensity level of composite emissions. In addition to, or rather than, one or more discrete-spectrum light sources, one or more continuous-spectrum light sources may be used. When determining appropriate intensity values for light sources that include at least one continuous-spectrum light source, Plank's law may be taken into account for the continuous-spectrum light sources, such that changes in intensity level may change the color temperature of the light emitted by the continuous-spectrum light source. Such an effect may lead to non-linear relationships between intensity levels of light sources and the color temperature of the combined emissions and/or of the composite intensity level of the emissions.

Figure 2:
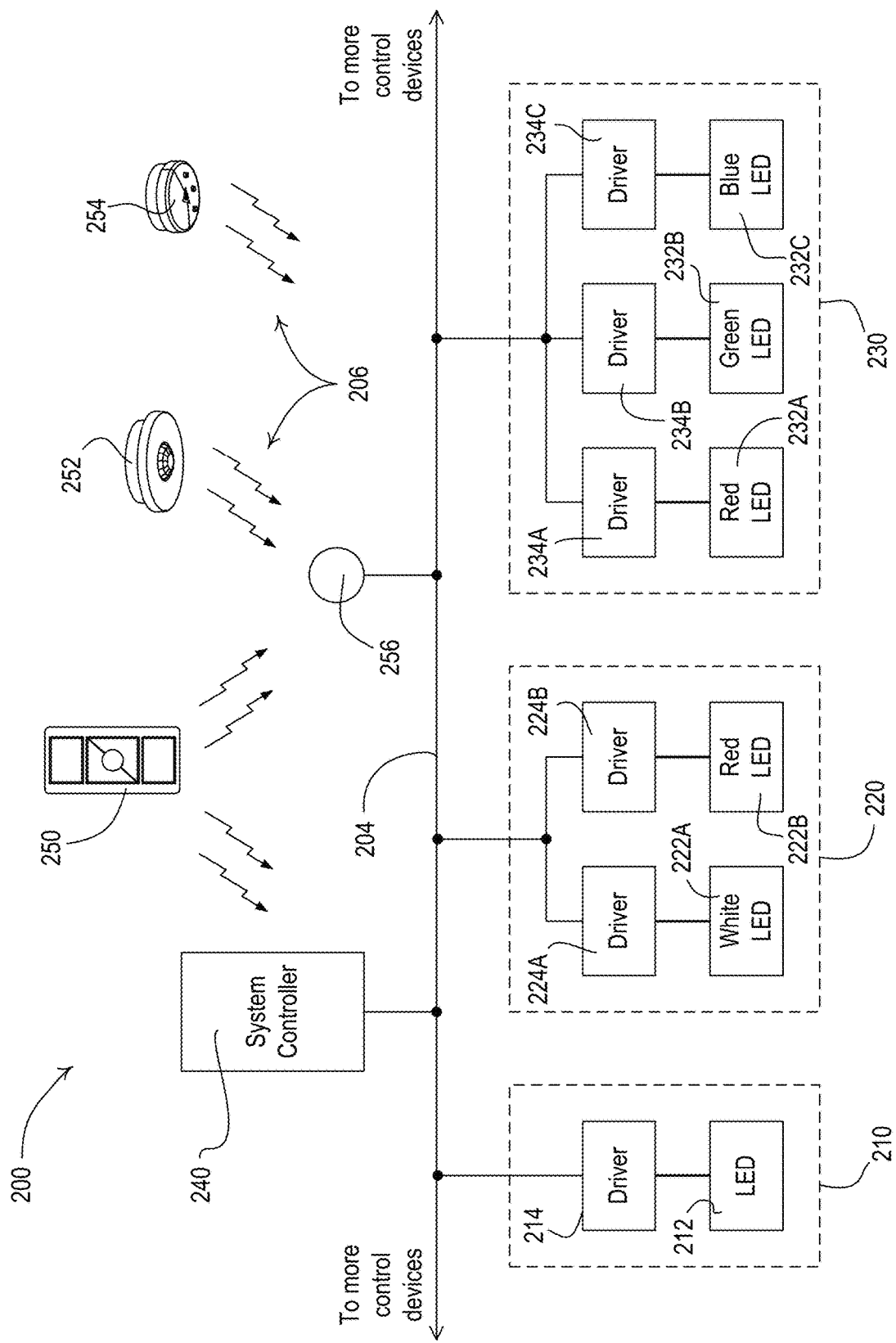
FIGS. 2-4 are simple diagrams of example load control systems, each having a plurality of lighting fixtures (e.g., multiple-driver lighting fixtures) for illuminating a space.

FIG. 2 is a simple diagram of an example load control system 200 having a plurality of lighting fixtures 210, 220, 230 for illuminating a space. The lighting fixture 210 may comprise a single lighting load (e.g., an LED light source 212) and a load regulation device (e.g., an LED driver 214) for controlling the LED light source 212. The lighting fixtures 220, 230 may be multi-channel lighting fixtures having LED light sources that have different operating characteristics (e.g., power rating, color temperature, etc.) as described in greater detail herein.

Utilizing multiple-discrete spectrum light sources within a fixture may present many and various advantages over fixtures comprising a single multi-channel driver. Such advantages may include flexibility, robustness, as well as other advantages. For example, when utilizing multiple-discrete spectrum light sources within a fixture, the number of channels to be used may be equivalent to the number of light sources (e.g., LED light sources) desired to be included in a fixture. This is in contrast to a single multi-channel driver, which may limit the number of channels to be used to the number of channels on the multi-channel driver. Utilizing multiple-discrete spectrum light sources within a fixture may allow variations in the size, cost, and/or efficiency of drivers (e.g., LED drivers) in each fixture. These variations may be used to easily and/or cost-effectively design fixtures for different needs, and may provide an advantage over a fixture comprising a single multi-channel driver, as designing optimized multi-channel drivers for particular installations may be impractical. Further, when utilizing multiple-discrete spectrum light sources within a fixture, if one driver (e.g., LED driver) fails, light may continue to be output from the fixture (e.g., light may be output from light sources controlled by working drivers within the fixture). This differs from when a multi-channel driver fails, e.g., because in such an example the entire fixture may discontinue outputting light altogether.

The LED driver 214 of the lighting fixture 210 may be coupled to a power source, such as an alternating-current (AC) power source and/or a direct-current (DC) power source, and may be configured to control the amount of power delivered to the LED light source 212 to adjust the intensity of the LED light source. The LED driver 214 may be coupled to a digital communication link 204, such that LED driver 214 is able to transmit and receive digital messages via the communication link 204. The LED driver 214 may be configured to control the LED light source 212 in response to digital messages received via the digital communication link 204. For example, the LED driver 214 may be configured to turn the LED light source 212 on and off and/or to adjust the intensity of the LED light source. The LED driver 214 may be configured to transmit a digital message including feedback information via the digital communication link 204.

The lighting fixture 220 may comprise multiple lighting loads (e.g., LED light sources 222A, 222B) and respective load regulation devices (e.g., LED drivers 224A, 224B). The LED drivers 224A, 224B may each be coupled to the digital communication link 204, such that each LED driver may transmit and receive digital messages via the communication link. The LED drivers 224A, 224B may be coupled to a power source, such as an alternating-current (AC) power source and/or a direct-current (DC) power source, and may be configured to control the amount of power delivered to the respective LED light sources 222A, 222B to adjust the intensity of the LED light sources. The LED drivers 224A, 224B may be configured to individually control the LED light sources 222A, 222B in response to the digital messages received via the communication link 204. The lighting fixture 220 may be, for example, a controllable-color lighting fixture (e.g., a controllable-color-temperature lighting fixture) where the LED light sources 222A, 222B are different color LED light sources and the light emitted by the LED light sources 222A, 222B may be mixed together to adjust the color (e.g., the color temperature) of the cumulative light emitted by the lighting fixture 220 (e.g., the correlated color temperature of the lighting fixture). For example, the LED light source 222A may be a white LED light source and the LED light source 222B may be a red LED light source. The LED drivers 224A, 224B may be configured to adjust the intensities of the white light emitted by the LED light source 222A and the red light emitted by the LED light source 222B, respectively, to control the color (e.g., the color temperature) of the cumulative light emitted by the lighting fixture 220, for example, in response to a single command (e.g., received in one or more digital messages transmitted via the communication link 204). The single command may include an identification (e.g., address) of the lighting fixture 220 to be controlled.

The single command may include a desired color (e.g., a desired color temperature) value of the composite light to be emitted from a lighting fixture. For example, the single command may include a desired color (e.g., a desired color temperature) value of the composite light being emitted from the lighting fixture 220. The color temperature value included in the single command may be a color temperature value along the black body temperature curve depicted in FIG. 1. The single command may include the desired overall and/or combined intensity level of the lighting fixture 220. The single command may include the desired overall and/or combined intensity level of the lighting fixture 220, in conjunction with a desired color (e.g., a desired color temperature). For example, the LED drivers 224A, 224B may be configured to control the respective LED light sources 222A, 222B to cause the lighting fixture 220 to emit a desired combined color, color temperature, and/or intensity, based on the single command.

The single command may include a desired color trajectory value of the composite light to be emitted from the controlled lighting fixture 220. The desired color trajectory may be a desired color temperature for the lighting fixture 220 with respect to a desired total intensity for the cumulative light emitted by the lighting fixture 220 (e.g., when the intensity of the lighting fixture 220 is being adjusted as described herein). For example, the single command may include the desired total intensity for the lighting fixture 220 and the LED drivers 224A, 224B may be configured to control the respective LED light sources 222A, 222B to cause the lighting fixture 220 to emit a color temperature as defined by the desired color trajectory. The color trajectory may correspond to the color temperature of a specific lamp (e.g., an incandescent lamp, a halogen lamp, or a fluorescent lamp), as the lamp is dimmed. For example, the color trajectory of the LED light fixture 220 may mimic an incandescent lamp when dimmed from a low-end intensity to a high-end intensity.

The single command may include a desired color map value of the composite light to be emitted from the controlled lighting fixture 220. For example, the single command may include the x and y coordinates of a specific color on the color map depicted in FIG. 1, and may also include a z parameter corresponding to a desired intensity of the specific color. The single command may include hue and/or saturation parameters of a specific color to be emitted from the controlled lighting fixture 220, and may also include a z parameter corresponding to a desired intensity of the specific color. The single command may include red, green, and blue (RGB) parameters of a specific color to be emitted from the controlled lighting fixture 220, and may also include a z parameter corresponding to a desired intensity of the specific color.

The LED drivers 224A, 224B of the lighting fixture 220 may be assigned a unique light engine (e.g., a color engine) that defines the appropriate intensities to which to control the respective LED light source in response to commands received via the communication link 204. The LED drivers 224A, 224B may use the color engines during normal operation of the load control system 200 to determine the appropriate intensity to control the respective LED light source to achieve a desired color, color temperature, color trajectory, color mapping, hue, saturation, and/or RGB colors for lighting fixture 220. For example, the color engine may define a fixed color (e.g., a fixed color temperature) for the lighting fixture 220.

The single command may include the desired intensity levels of discrete-spectrum light sources, e.g., the single command may include the desired intensity levels of each of the LED light source 222A and/or the LED light source 222B. For example, the single command may instruct LED driver 224A to provide an intensity level to LED light source 222A, and the single command may instruct LED light source 224B to provide another intensity level to LED light source 222B. For example, the LED drivers 224A, 224B may be configured to receive a single command and/or control the respective LED light sources 222A, 222B to become redder as the total intensity of the cumulative light emitted by the lighting fixture 220 is decreased (e.g., dimmed).

The LED drivers 224A, 224B of the lighting fixture 220 may have different power ratings. For example, the LED driver 224B for the LED light source 222B (e.g., the red LED light source) may have a smaller power rating than the LED driver 224A for the LED light source 222A (e.g., the white LED light source), e.g., if a small shift towards a redder color (e.g., a redder color temperature) is desired when the total intensity of the cumulative light emitted by the lighting fixture 220 is decreased. As an example, one LED driver (e.g., the LED driver 224B) may be rated for 20 watts, and another LED driver (e.g., the LED driver 224A) may be optimized for 40 watts. Allowing the LED drivers 224A, 224B of the lighting fixture 220 to have different power ratings may provide advantages. A combination of the LED drivers having different power ratings may be used, for example, to minimize cost and size and maximum efficiencies of the LED drivers.

The lighting fixture 230 may comprise a plurality of lighting loads (e.g., LED light sources 232A, 232B, 232C) and respective load regulation devices (e.g., LED drivers 234A, 234B, 234C). The LED drivers 234A, 234B, 234C may each be coupled to the digital communication link 204, such that each LED driver is able to transmit and receive digital messages via the communication link. The LED drivers 234A, 234B, 234C may be coupled to a power source, such as an alternating-current (AC) power source and/or a direct-current (DC) power source, and may be configured to control the amount of power delivered to the respective LED light sources 232A, 232B, 232C to adjust the intensity of the LED light sources. The LED drivers 234A, 234B, 234C may be configured to individually control the LED light sources 232A, 232B, 232C in response to the digital messages received via the communication link 204. For example, the lighting fixture 230 may be a controllable-color-temperature lighting fixture (e.g., an RGB lighting fixture), where the LED light source 232A is a red LED light source, the LED light source 232B is a green LED light source, and the LED light source 232C is a blue LED light source. The LED drivers 234A, 234B, 234C may be configured to adjust the intensities of the light emitted by the respective LED light sources 232A, 232B, 232C to control the color (e.g., the color temperature) of the cumulative light emitted by the lighting fixture 230, for example, in response to a single command received via the communication link 204. The single command may include an identification (e.g., address) of the lighting fixture 220 to be controlled.

The single command may include a desired color (e.g., a desired color temperature) value of the composite light being emitted from the lighting fixture 230, and/or the single command may include the desired overall or combined intensity level of the of the lighting fixture 230. For example, the LED drivers 234A, 234B, 234C may be configured to control the respective LED light sources 232A, 232B, 232C to emit a desired color (e.g., a desired color temperature) and/or combined intensity, based on the single command. The color temperature value included in the single command may be a color temperature value along the black body temperature curve depicted in FIG. 1. The single command may include the desired intensity levels of discrete-spectrum light sources, e.g., the single command may include the desired intensity levels of the LED light source 232A, the LED light source 232B, and the LED light source 232C. For example, the LED drivers 234A, 234B, 234C may be configured to control the color, color temperature, and/or intensity level of the lighting fixture 230, based on the single command.

The single command may include a desired color trajectory value of the composite light to be emitted from the controlled lighting fixture 230. The desired color trajectory may be a desired color temperature for the lighting fixture 230 with respect to a desired total intensity for the cumulative light emitted by the lighting fixture 230 (e.g., when the intensity of the lighting fixture 230 is being adjusted as described herein). For example, the single command may include the desired total intensity for the lighting fixture 230 and the LED drivers 234A, 234B, 234C may be configured to control the respective LED light sources 232A, 232B, 232C to cause the lighting fixture 230 to emit a color temperature as defined by the desired color trajectory. The color trajectory may correspond to the color temperature of a specific lamp (e.g., an incandescent lamp, a halogen lamp, or a fluorescent lamp), as the lamp is dimmed. For example, the color trajectory of the LED light fixture 230 may mimic an incandescent lamp when dimmed from a low-end intensity to a high-end intensity.

The single command may include a desired color map value of the composite light to be emitted from the lighting fixture 230. For example, the single command may include the x and y coordinates of a specific color on the color map depicted in FIG. 1, and may also include a z parameter corresponding to a desired intensity of the specific color.

The single command may include hue and/or saturation parameters of a specific color to be emitted from the lighting fixture 230, and may also include a z parameter corresponding to a desired intensity of the specific color. The single command may include red, green, and blue (RGB) parameters of a specific color to be emitted from the lighting fixture 230, and may also include a z parameter corresponding to a desired intensity of the specific color.

The LED drivers 234A, 234B, 234C of the lighting fixture 230 may be assigned a unique light engine (e.g., a color engine) that defines the appropriate intensities to which to control the respective LED light source in response to commands received via the communication link 204. The LED drivers 234A, 234B, 234C may use the color engines during normal operation of the load control system 200 to determine the appropriate intensity to control the respective LED light source to achieve a desired color, color temperature, color trajectory, color mapping, hue, saturation, and/or RGB colors for lighting fixture 230. For example, the color engine may define a fixed color (e.g., a fixed color temperature) for the lighting fixture 230.

The load control system 200 may further comprise a system controller 240 (e.g., a central controller or a load controller) coupled to the digital communication link 204 for transmitting and receiving digital messages. For example, the system controller 240 may be configured to transmit digital messages to the LED drivers of the lighting fixtures 210, 220, 230 for turning the lighting fixtures on and off and/or adjusting at least one of the intensity, color, and/or the color temperature of the cumulative light emitted by the respective lighting fixture. For example, the system controller 240 may be configured to transmit a single command to both of the LED drivers 224A, 224B of the lighting fixture 220 to cause both of the LED drivers to appropriately control the respective LED light sources 222A, 222B to control the color (e.g., the color temperature) of the cumulative light emitted by the lighting fixture 220 to a desired color (e.g., a desired color temperature). Similarly, the system controller 240 may be configured to transmit a single command to the LED drivers 234A, 234B, 234C of the lighting fixture 230 to cause the LED drivers to appropriately control the respective LED light sources 232A, 232B, 232C to control the color (e.g., the color temperature) of the cumulative light emitted by the lighting fixture 230 to a desired color (e.g., a desired color temperature).

The digital communication link 204 may comprise a wired communication link, for example, a digital communication link operating in accordance with a predefined communication protocol (such as, for example, one of Ethernet, IP, XML, Web Services, QS, DMX, BACnet, Modbus, LonWorks, and/or KNX protocols), a serial digital communication link, an RS-485 communication link, an RS-232 communication link, a digital addressable lighting interface (DALI) communication link, and/or a LUTRON ECOSYSTEM communication link. The digital communication link 204 may comprise a wireless communication link, for example, a radio-frequency (RF), infrared (IR), and/or optical communication link. Digital messages may be transmitted on an RF communication link using, for example, one or more of a plurality protocols, such as the LUTRON CLEARCONNECT, WIFI, ZIGBEE, Z-WAVE, KNX-RF, and/or ENOCEAN RADIO protocols.

The load control system 200 may comprise one or more input devices, e.g., such as a remote control device 250, an occupancy sensor 252, and/or a daylight sensor 254. The remote control device 250, the occupancy sensor 252, and/or the daylight sensor 254 may be battery-powered wireless control devices (e.g., RF transmitters) configured to transmit digital messages to the system controller 240 via wireless signals, e.g., RF signals 206 (e.g., directly to the system controller 240). The load control system 200 may comprise a wireless adapter device 256 coupled to the digital communication link 204 and configured to receive the RF signals 206. The wireless adapter device 256 may be configured to transmit one or more digital messages to the system controller 240 via the digital communication link 204 in response to digital messages received from one of the wireless control devices via the RF signals 206. For example, the wireless adapter device 256 may re-transmit the digital messages received from the wireless control devices on the digital communication link 204. The system controller 240 may be configured to transmit one or more digital messages to the LED drivers in response to the digital messages received from the remote control device 250, the occupancy sensor 252, and/or the daylight sensor 254. An example of a load control system for controlling the color temperatures of lighting fixtures in response to different types of input devices is described in greater detail in commonly-assigned U.S. Patent Application Publication No. 2014/0312777, published Oct. 23, 2014, entitled SYSTEMS AND METHODS FOR CONTROLLING COLOR TEMPERATURE, the entire disclosure of which is hereby incorporated by reference The remote control device 250 may provide for manual control of the intensities, colors, and/or color temperatures of the lighting fixtures 210, 220, 230. The remote control device 250 may comprise one or more buttons for receiving user inputs. For example, buttons corresponding to scenes may be provided on the remote control device 250. As an example, buttons corresponding to different lighting presets or scenes (e.g., an entertaining scene, a cooking scene, a bedtime scene, a movie scene, and the like) may be provided on the remote control device 250. For example, the lighting fixtures 210, 220, 230 may be controlled to emit different color temperatures depending on the selected preset or scene. The remote control device 250 may be configured to transmit digital messages to the system controller 240 via the RF signals 206 in response to an actuation of one or more of the buttons and/or scenes.

The occupancy sensor 252 may be configured to detect occupancy and/or vacancy conditions in the space in which the load control system 200 is installed. The occupancy sensor 252 may transmit digital messages to the system controller 240 via the RF signals 206 in response to detecting the occupancy and/or vacancy conditions. The system controller 240 may each be configured to turn one or more of the LED light sources of the lighting fixtures 210, 220, 230 on and off in response to receiving an occupied command and a vacant command, respectively. For example, the lighting fixtures 210, 220, 230 may be controlled to emit color temperatures that correspond to more efficient operation of the respective LED drivers in response to detecting a vacancy condition in the space. The occupancy sensor 252 may operate as a vacancy sensor, such that the LED light sources are turned off in response to detecting a vacancy condition (e.g., not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 254 may be configured to measure a total light intensity in the space in which the load control system is installed. The daylight sensor 254 may transmit digital messages including the measured light intensity to the system controller 240 via the RF signals 206 for controlling the intensities, colors, and/or the color temperatures of one or more of the LED light sources of the lighting fixtures 210, 220, 230 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control system 200 may comprise other types of input devices, such as, for example, temperature sensors; humidity sensors; radiometers; window sensors; shadow sensors; cloudy-day sensors; pressure sensors; smoke detectors; carbon monoxide detectors; air-quality sensors; motion sensors; security sensors; proximity sensors; fixture sensors; partition sensors; keypads; kinetic or solar-powered remote controls; key fobs; cell phones; smart phones; tablets; personal digital assistants; personal computers; laptops; time-clocks; audio-visual controls; safety devices; power monitoring devices (such as power meters, energy meters, utility submeters, utility rate meters, etc.), central control transmitters; residential, commercial, or industrial controllers, or any combination of these input devices. Examples of load control systems are described in greater detail in commonly-assigned U.S. Patent Application Publication No. 2014/0001977, published Jan. 2, 2014, entitled LOAD CONTROL SYSTEM HAVING INDEPENDENTLY-CONTROLLED UNITS RESPONSIVE TO A BROADCAST CONTROLLER, and U.S. Patent Application Publication No. 2014/0265568, published Sep. 18, 2014, entitled COMMISSIONING LOAD CONTROL SYSTEMS, the entire disclosures of which are hereby incorporated by reference.

The LED drivers of each of the lighting fixtures 220, 230 may be configured during a configuration procedure that may be executed prior to shipment of the LED drivers to the installation site of the load control system 200. For example, the LED drivers of each of the lighting fixtures 220, 230 may be configured using a configuration tool at an original equipment manufacturer (OEM). During the configuration procedure, the LED drivers of each of the lighting fixtures 220, 230 (e.g., the LED drivers of the respective lighting fixtures 220, 230) may be assigned an identical fixture address, e.g., a fixture serial number (e.g., the same fixture address or serial number to each of the LED drivers). For example, the LED drivers of the lighting fixture 220 may each be assigned a first fixture address and the LED drivers of the lighting fixture 230 may each be assigned a second fixture address. The LED drivers of each of the lighting fixtures 220, 230 may be assigned a unique sub-address that uniquely identifies the LED driver within the respective lighting fixture during the configuration procedure. For example, the LED drivers 224A, 224B of the lighting fixture 220 may be assigned sub-addresses of one and two, respectively. The LED drivers 234A, 234B, 234C of the lighting fixture 230 may be assigned sub-addresses of one, two, and three, respectively. An example of a configuration tool for an LED driver is described in greater detail in commonly-assigned U.S. Pat. No. 8,810,159, issued Aug. 19, 2014, entitled SYSTEM AND METHOD FOR PROGRAMMING A CONFIGURABLE LOAD CONTROL DEVICE, the entire disclosure of which is hereby incorporated by reference.

The LED drivers of each of the lighting fixtures 220, 230 may be assigned a unique light engine (e.g., a color engine) that defines the appropriate intensities to which to control the respective LED light source in response to commands received via the communication link 204. The LED drivers may use the color engine during normal operation of the load control system 200 to determine the appropriate intensity to which to control the respective LED light source to achieve a desired color (e.g., a desired color temperature) for the respective lighting fixture. For example, the color engine may define a fixed color (e.g., a fixed color temperature) for the lighting fixture. The color engine may define a color trajectory, which may be a desired color temperature for the lighting fixture with respect to a desired total intensity for the cumulative light emitted by the lighting fixture (e.g., when the intensity of the lighting fixture 220 is being adjusted as described above). The color trajectory may correspond to the color temperature of a specific lamp (e.g., an incandescent lamp, a halogen lamp, or a fluorescent lamp) as the lamp is dimmed. For example, the color trajectory of an LED light fixture may mimic an incandescent lamp when dimmed from a low-end intensity to a high-end intensity. Further, the color engine may define a color map for the lighting fixture, where a single command transmitted to the LED drivers of a lighting fixture may identify a specific color (e.g., a specific color temperature) for the lighting fixture (e.g., controlling the color (e.g., the color temperature) of the lighting fixture 230 to any color temperature as described herein).

After the configuration procedure, the LED light sources and the LED drivers may be installed in the lighting fixtures 220, 230 prior to shipment to the installation site of the load control system 200, for example, at the OEM. The lighting fixtures 220, 230 may be calibrated during a calibration procedure prior to shipment to the installation site of the load control system 200. For example, the color (e.g., the color temperature) of the cumulative light emitted by each of the lighting fixtures 220, 230 may be measured at various operating points and the color engines in the LED drivers may be adjusted to ensure that the cumulative light emitted by the lighting fixtures has the correct color (e.g., the correct color temperature) at the various operating points.

After the lighting fixtures 220, 230 are shipped and installed at the installation site, the load control system 200 may be programmed during a setup and commissioning procedure. During the setup and commissioning procedure, the system controller 240 may assign a link address to each of the LED drivers on the communication link 204. The link address may be included in the digital messages transmitted to each of the LED drivers during normal operation of the load control system 200 for performing load control. For example, the system controller 240 may assign a first link address to the LED driver 214 of the lighting fixture 210. For the lighting fixtures 220, 230 that have multiple LED drivers, the system controller 240 may use the fixture address of the LED drivers to assign the same link address to the LED drivers of a single fixture. For example, the system controller 240 may assign a second link address to the LED drivers 224A, 224B of the lighting fixture 220 since these LED drivers have the same fixture address (which may be assigned during the configuration procedure of the LED drivers). The system controller 240 may assign a third link address to the LED drivers 234A, 234B, 234C of the lighting fixture 230.

The system controller 240 may be configured to transmit a single digital message to each of the LED drivers 224A, 224B in the lighting fixture 220 by including the link address of the lighting fixture 220 in the digital message. The single digital message transmitted to each of the LED drivers 224A, 224B may be used to control each respective LED light source 222A, 222B, e.g., to control the intensity levels of the LED light source 222A and the LED light source 222B. The single digital message may also include a command to control the cumulative light emitted by the lighting fixture 220 to a specific color (e.g., a specific color temperature). The LED drivers 224A, 224B may each receive the digital message and may use the stored color engine to determine how to control the respective LED light source 222A, 222B to achieve the correct color (e.g., the correct color temperature) for the lighting fixture 220. Similarly, the system controller 240 may be configured to transmit a single digital message to the LED drivers 234A, 234B, 234C in the lighting fixture 230 by including the link address of the lighting fixture 230 in the digital message.

The system controller 240 may be configured to transmit a digital message directly to one or more of the LED drivers 224A, 224B using the link address of the lighting fixture 220 and the sub-address of the respective LED driver (e.g., as was stored in the LED driver during the configuration procedure). For example, the system controller 240 may be configured to transmit a digital message to the LED driver 224B of the lighting fixture 220 using the first link address and the sub-address two. The LED drivers of the lighting fixtures 220, 230 may include the link address of the lighting fixture and the sub-address of the respective LED driver in any digital messages transmitted on the communication link 204 to specify which LED driver transmitted the digital message. Similarly, the system controller 240 may be configured to transmit a digital message directly to one of the LED drivers 234A, 234B, 234C using the link address of the lighting fixture 230 and the sub-address of the respective LED driver.

The LED drivers of the multi-channel lighting fixtures (e.g., the lighting fixtures 220, 230) may operate to provide a wider output range at a single color (e.g., a single color temperature) (e.g., rather than operating to adjust the color (e.g., the color temperature) of the cumulative light emitted by the respective lighting fixture). For example, the LED light sources 222A, 222B of the lighting fixture 220 may be characterized by the same color (e.g., the same color temperature), and the LED drivers 224A, 224B may have different power ratings to provide a wider output range for the lighting fixture 220 than if the LED drivers had the same power ratings. The LED driver 224A for the LED light source 222A may have, for example, a higher power rating than the LED driver 224B for the LED light source 222B. The LED driver 224A may adjust the intensity of the LED light source 222A to adjust the total intensity of the cumulative light emitted by the lighting fixture 220 from approximately 100% to 10%, and the LED driver 224B may adjust the intensity of the LED light source 222B to adjust the total intensity of the cumulative light emitted by the lighting fixture 220 from approximately 10% to 1%. Though example power ratings are provided herein, other power ratings may be used for different LED drivers to control the total light emitted by a lighting fixture.

The load control system 200 may comprise one or more other types of load control devices, such as, for example, a dimming circuit for a lighting load, such as incandescent lamp or halogen lamp; an electronic dimming ballast for a fluorescent lamp; a screw-in luminaire including a dimmer circuit and an incandescent or halogen lamp; a screw-in luminaire including a ballast and a compact fluorescent lamp; and a screw-in luminaire including an LED driver and an LED light source.

Figure 3:
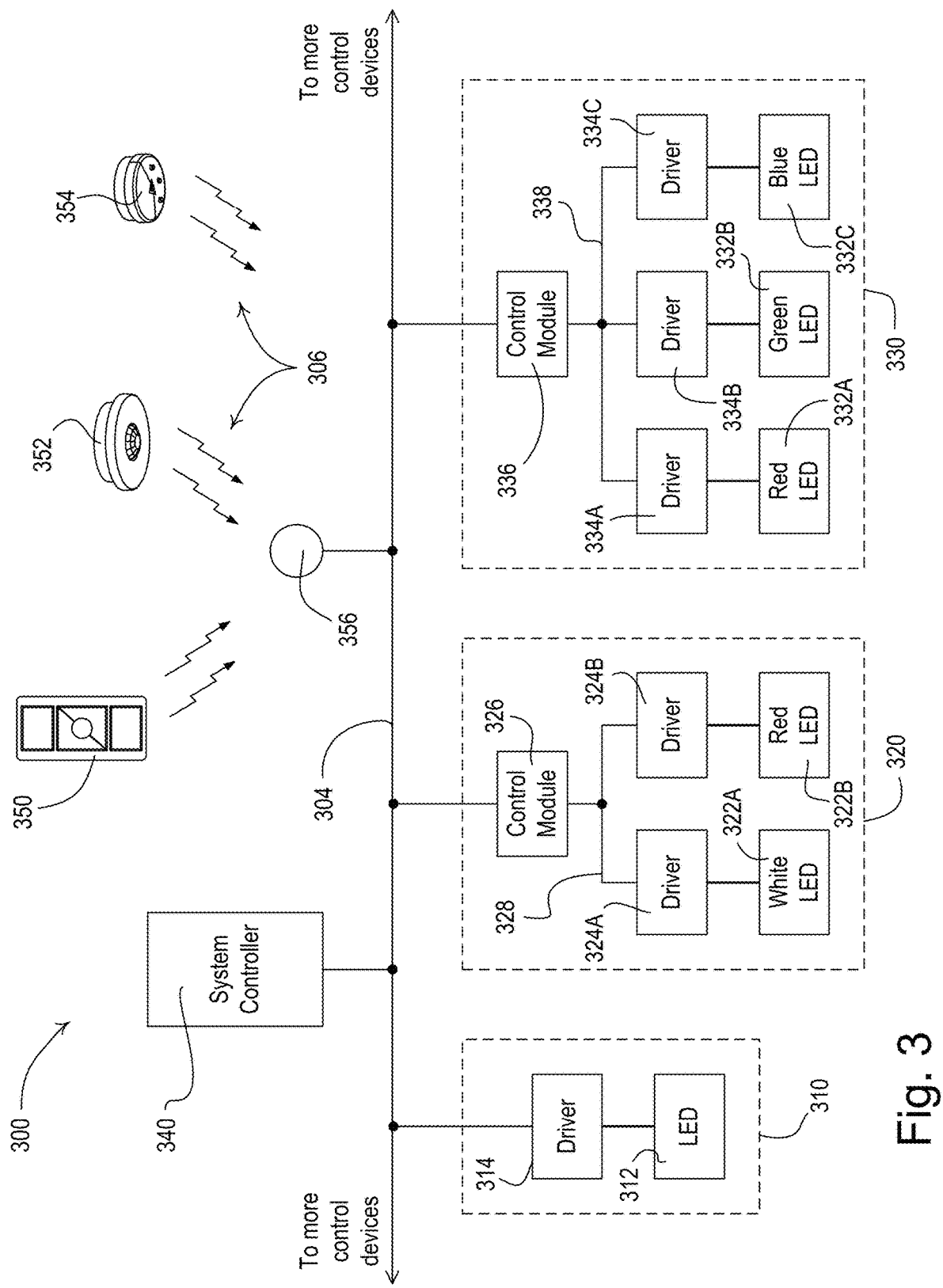

FIG. 3 is a simple diagram of another example load control system 300 having a plurality of lighting fixtures 310, 320, 330 for illuminating a space. The lighting fixture 310 may comprise a single lighting load (e.g., an LED light source 312) and a load regulation device (e.g., an LED driver 314) for controlling the LED light source. The LED driver 314 may be configured to control the LED light source 312 in response to digital messages received via a digital communication link 304. The LED driver 314 may be configured to transmit a digital message including feedback information via the digital communication link 304. The digital communication link 304 may be similar to the digital communication link 204 of the load control system 200 shown in FIG. 2.

The lighting fixture 320 may comprise multiple lighting loads (e.g., LED light sources 322A, 322B) and respective load regulation devices (e.g., LED drivers 324A, 324B). The lighting fixture 320 may comprise a control module 326 coupled to the digital communication link 304. The control module 326 may be coupled to the LED drivers 324A, 324B via a fixture control link 328, which may comprise a digital communication link (e.g., a wired or wireless communication link). Alternatively, or additionally, the fixture control link 328 could comprise an analog control link. The control module 326 may be configured to individually control the LED drivers 324A, 324B in response to digital messages received via the communication link 304.

The control module 326 and/or the LED drivers 324A, 324B of the lighting fixture 320 may be assigned a unique light engine (e.g., a color engine) that defines the appropriate intensities to which to control the respective LED light source in response to commands received via the communication link 304. The control module 326 may send instructions to LED drivers 324A, 324B, for controlling the respective LED light source(s) to achieve a desired color, color temperature, color trajectory, color mapping, hue, saturation, and/or RGB colors for lighting fixture 320. In an example, the control module 326 may send instructions to the address (e.g., sub-addresses) of LED drivers 324A, 324B, for controlling the intensities of each of the respective LED light sources. This may allow legacy LED drivers to be used in certain implementations.

The LED drivers 324A, 324B may use color engines during normal operation of the load control system 300 to, for example, determine the appropriate intensity to control the respective LED light source(s) to achieve a desired color, color temperature, color trajectory, color mapping, hue, saturation, and/or RGB colors for lighting fixture 320. For example, the color engines may define a fixed color (e.g., a fixed color temperature) for the lighting fixture 320.

As in the load control system of FIG. 2, the lighting fixture 320 may be, for example, a controllable-color-temperature lighting fixture where the LED light sources 322A, 322B are different color LED light sources (e.g., white and red LED light sources, respectively). The control module 326 may be configured to individually control the LED drivers 324A, 324B to adjust the intensities of the white light emitted by the LED light source 322A and the red light emitted by the LED light source 322B, respectively, to control the color (e.g., the color temperature) of the cumulative light emitted by the lighting fixture 320, for example, in response to a single command received via the communication link 304.

The single command may include parameters as described herein. For example, the single command may include a desired color, color temperature, color trajectory, color mapping, hue, saturation, and/or RGB value of the composite light being emitted from the lighting fixture 320, as described herein. The single command may include the desired overall or combined intensity level of the lighting fixture 320. For example, the LED drivers 324A, 324B may be configured to control the respective LED light sources 322A, 322B to emit a desired color (e.g., a desired color temperature) and/or combined intensity, based on the single command. The single command may include the desired intensity levels of discrete-spectrum light sources, e.g., the single command may include parameters that identify the desired intensity levels of the LED light source 322A and the LED light source 322B. For example, the control module 326 may be configured to control the cumulative light emitted by the lighting fixture 320 to become redder as the total intensity of the cumulative light is decreased (e.g., dimmed). The LED drivers 324A, 324B may be configured to transmit feedback to the control module 326 via the fixture control link 328.

The lighting fixture 330 may comprise a plurality of lighting loads (e.g., LED light sources 332A, 332B, 332C) and respective load regulation devices (e.g., LED drivers 334A, 334B, 334C). The lighting fixture 330 may also comprise a control module 336 coupled to the digital communication link 304. The control module 336 may be coupled to the LED drivers 334A, 334B, 334C via a fixture control link 338, which may comprise a digital communication link or an analog control link. The control module 336 may be configured to individually control the LED drivers 334A, 334B, 334C in response to the digital messages received via the communication link 304.

The control module 336 and/or the LED drivers 334A, 334B, 334C of the lighting fixture 330 may be assigned a unique light engine (e.g., a color engine) that defines the appropriate intensities to which to control the respective LED light source in response to commands received via the communication link 304. The control module 336 may send instructions to LED drivers 334A, 334B, 334C, for controlling the respective LED light source(s) to achieve a desired color, color temperature, color trajectory, color mapping, hue, saturation, and/or RGB colors for lighting fixture 330. In an example, the control module 336 may send instructions to the address (e.g., sub-addresses) of LED drivers 334A, 334B, 334C, for controlling the intensities of each of the respective LED light sources. This may allow legacy LED drivers to be used in certain implementations.

The LED drivers 334A, 334B, 334C may use color engines during normal operation of the load control system 300 to, for example, determine the appropriate intensity to control the respective LED light source(s) to achieve a desired color, color temperature, color trajectory, color mapping, hue, saturation, and/or RGB colors for lighting fixture 330. For example, the color engine may define a fixed color (e.g., a fixed color temperature) for the lighting fixture 330.

The lighting fixture 330 may be a controllable-color-temperature lighting fixture (e.g., an RGB lighting fixture), where the LED light sources 332A, 332B, 332C are different color LED light sources (e.g., red, green, and blue LED light sources, respectively). The control module 336 may be configured to control the LED drivers 334A, 334B, 334C to adjust the intensities of the light emitted by the respective LED light sources 332A, 332B, 332C to control the color (e.g., the color temperature) of the cumulative light emitted by the lighting fixture 330, for example, in response to a single command received via the communication link 304, as described herein.

The single command may include a desired color (e.g., a desired color temperature) value of the composite light being emitted from the lighting fixture 330, and/or the single command may include the desired overall or combined intensity level of the of the lighting fixture 330. For example, the LED drivers 334A, 334B, 334C may be configured to control the respective LED light sources 332A, 332B, 332C to emit a desired color (e.g., a desired color temperature) and/or combined intensity, based on the single command. The single command may include the desired intensity levels of discrete-spectrum light sources, e.g., the single command may include the desired intensity levels of the LED light source 332A, the LED light source 332B, and the LED light source 332C. For example, the control module 336 may be configured to control the color (e.g., the color temperature) of the cumulative light emitted by the lighting fixture 330 to any desired color (e.g., any desired color temperature). The LED drivers 334A, 334B, 334C may be configured to transmit feedback to the control module 336 via the fixture control link 338.

The load control system 300 may further comprise a system controller 340 coupled to the digital communication link 304 for transmitting and receiving digital messages. For example, the system controller 340 may be configured to transmit digital messages directly to the LED driver 314 for controlling the LED light source 312 of the lighting fixture 310. The system controller 340 may be configured to transmit digital messages to the control modules 326, 336 of the lighting fixtures 320, 330 for turning the lighting fixtures on and off and/or adjusting at least one of the intensity, color, and color temperature of the cumulative light emitted by the respective lighting fixture. The control modules 326, 336 may be configured to transmit digital messages (e.g., including the feedback received from the respective LED drivers) to the system controller 340. Feedback may include present current and/or voltage levels of the respective LED drivers, faulting and/or missing color engines of the respective LED drivers, hours of operation of the respective LED drivers, thermal states of the respective LED drivers, internally computed power levels of the respective LED drivers, and the like.

The load control system 300 may comprise one or more input devices, e.g., such as a remote control device 350, an occupancy sensor 352, and/or a daylight sensor 354, which may operate in a similar manner as the remote control device 250, the occupancy sensor 252, and the daylight sensor 254, respectively, of the load control system 200 shown in FIG. 2. The input devices may be configured to transmit digital messages directly to the system controller 340 via RF signals 306. The load control system 300 may comprise a wireless adapter device 356 configured to transmit digital messages to the system controller 340 via the communication link 304 in response to digital message received from the input devices via the RF signals 306.

During a setup and commissioning procedure of the load control system 300, the system controller 340 may be configured to assign a link address to each of the LED driver 314 of the lighting fixture 310 and the control modules 326, 336 of the lighting fixtures 320, 330 for use in communication during normal lighting control operation of the load control system 300. For example, the system controller 340 may assign a first link address to the LED driver 314 of the lighting fixture 310, a second link address to the control module 326 of the lighting fixture 320, and a third link address to the control module 336 of the lighting fixture 330.

The LED drivers of each of the lighting fixtures 320, 330 may each be assigned a unique fixture-control-link address that uniquely identifies the LED driver within the respective lighting fixture. For example, the unique fixture-control-link addresses may be assigned to the LED drivers during a configuration procedure at an OEM or by the control modules 326, 336 after installation. The control modules 326, 336 may use the unique fixture-control-link addresses to individually control the respective LED drivers. The unique fixture-control-link addresses may be communicated to the control modules 326, 336 or pre-stored at the control modules 326, 336 and determined to control each of the local drivers. The control modules 326, 336 may be assigned a color engine for appropriately controlling the LED light sources in the respective lighting fixture 320, 330 to the correct color (e.g., color temperature), for example, during the configuration procedure at the OEM. The color engine may define a fixed color, color temperature, color trajectory, color map, hue, saturation, and/or RGB value.

Figure 4:
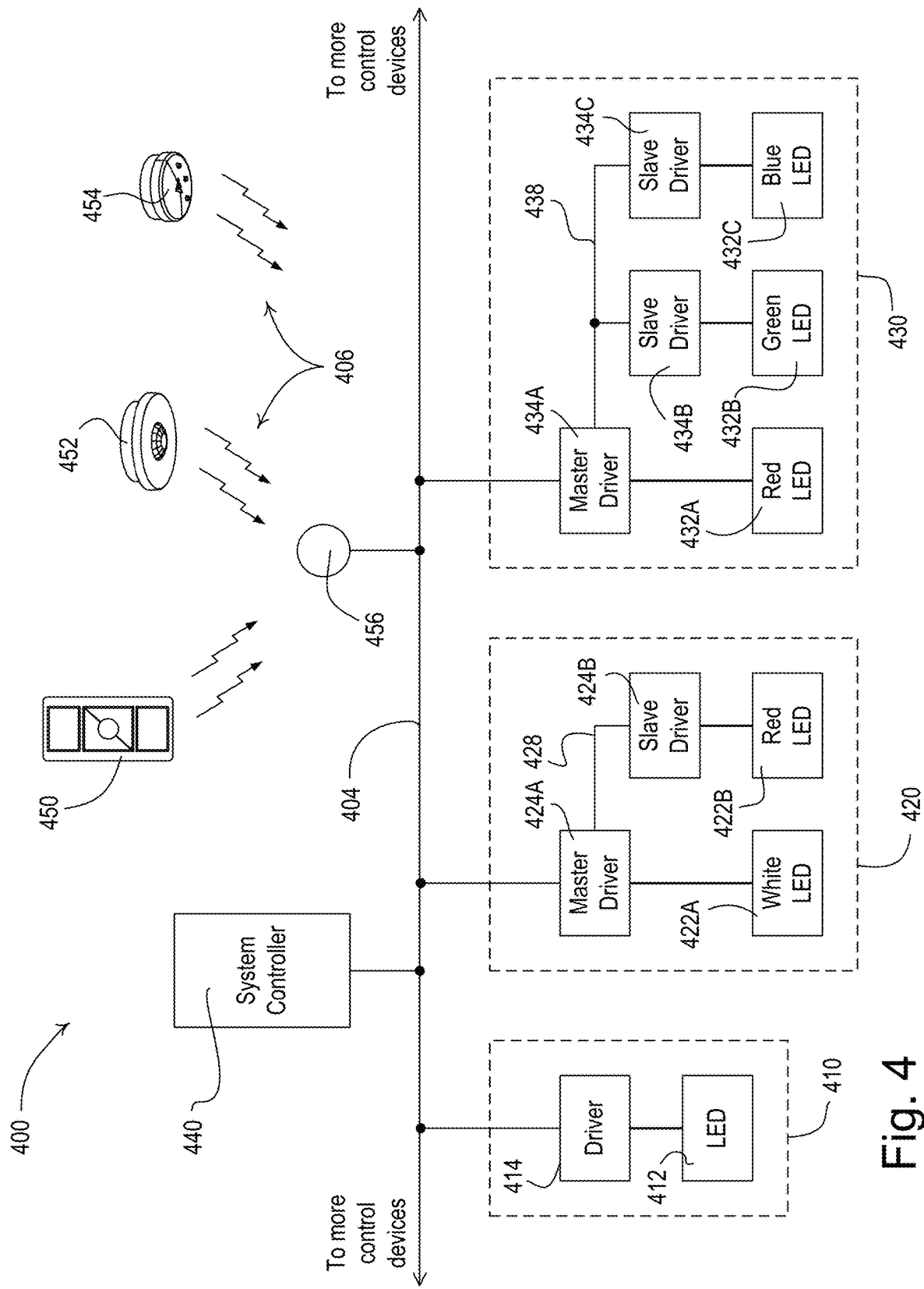

FIG. 4 is a simple diagram of another example load control system 400 having a plurality of lighting fixtures 410, 420, 430 for illuminating a space. The load control system 400 of FIG. 4 may operate in a similar manner as the load control system 300 of FIG. 3. The lighting fixtures 420, 430 of the load control system 400 may comprise master LED drivers 424A, 434A. The master LED driver 424A, 434A may be coupled to a digital communication link 404 for transmitting and receiving digital messages.

For example, the master LED driver 424A of the lighting fixture 420 may be directly coupled to an LED light source 422A (e.g., a white LED light source) and may be configured to control the amount of power delivered from a power source to the LED light source 422A to adjust the intensity of the LED light source. The master LED driver 424A may be coupled via a fixture control link 428 to a slave LED driver 424B, which may be coupled to an LED light source 422B (e.g., a red LED light source). The master LED driver 424A may be configured to control the slave LED driver 424B via the fixture control link 428. The master LED driver 424A may be configured to directly adjust the intensity of the white LED light source 422A and to control the slave LED driver 424B to adjust the intensity of the red LED light source 422B in response to a digital message received via the communication link 404.

The master LED driver 424A may be configured to control the intensities of the LED light sources 422A, 422B to control the intensity, color, and/or color temperature of the cumulative light emitted by the lighting fixture 420 (e.g., in a similar manner as the control module 326 of the load control system 300 shown in FIG. 3). The master LED driver 424A may be configured to control the intensities of the LED light sources 422A, 422B to control the intensity, color, and/or color temperature of the cumulative light emitted by the lighting fixture 420, for example, in response to a single command received via the communication link 404.

The single command may include parameters as described herein. For example, the single command may include a desired color, color temperature, color trajectory, color mapping, hue, saturation, and/or RGB value of the composite light being emitted from the lighting fixture 420, as described herein, and/or the single command may include the desired overall or combined intensity level of the of the lighting fixture 420. The single command may include the desired intensity levels of discrete-spectrum light sources, e.g., the single command may include the desired intensity levels of the LED light source 422A and the LED light source 422B. For example, the master LED driver 424A may be configured to control the cumulative light emitted by the lighting fixture 420 to become redder as the total intensity of the cumulative light is decreased (e.g., dimmed). The slave LED driver 424B may be configured to transmit feedback to the master LED driver 424A via the fixture control link 428. The master driver 424A may receive a total desired intensity level, color, and/or color temperature, and control the LED light source 422A and the slave driver 424B to output the desired intensity level, color, and/or color temperature.

The master LED driver 434A of the lighting fixture 430 may be directly coupled to an LED light source 432A (e.g., a red LED light source) and may be configured to control the amount of power delivered from the power source to the LED light source 432A to adjust the intensity of the LED light source. The master LED driver 434A may be coupled to slave LED drivers 434B, 434C via a fixture control link 438. The slave LED drivers 434B, 434C of the lighting fixture 430 may be coupled to LED light source 432B, 432C, e.g., a green LED light source and a blue LED light source, respectively. The master LED driver 434A of the lighting fixture 430 may be configured to directly adjust the intensity of the red LED light source 432A and to control the slave LED drivers 434B, 434C to adjust the intensities of the green LED light source 432B and the blue LED light source 432C, respectively, in response to a digital message received via the communication link 404. The master LED driver 424A may be configured to control the intensities of the LED light sources 432A, 432B, 432C to control the intensity, color, and/or the color temperature of the cumulative light emitted by the lighting fixture 430 (e.g., in a similar manner as the control module 336 of the load control system 300 shown in FIG. 3). The master LED driver 434A may be configured to control the intensities of the LED light sources 432A, 432B, 432C to control the intensity, color, and/or color temperature of the cumulative light emitted by the lighting fixture 430, for example, in response to a single command received via the communication link 404.

The single command may include a desired color (e.g., a desired color temperature) value of the composite light being emitted from the lighting fixture 430, and/or the single command may include the desired overall or combined intensity level of the of the lighting fixture 430. The single command may include the desired intensity levels of discrete-spectrum light sources, e.g., the single command may include the desired intensity levels of the LED light source 432A, the LED light source 432B, and the LED light source 432C. For example, the master LED driver 434A may be configured to control the color (e.g., the color temperature) of the cumulative light emitted by the lighting fixture 430 to any desired color (e.g., any desired color temperature). The slave LED drivers 434B, 434C may be configured to transmit feedback to the master LED driver 434A via the fixture control link 438.

The load control system 400 may further comprise a system controller 440 coupled to the digital communication link 404 for transmitting and receiving digital messages. The system controller 440 may be configured to transmit digital messages to the driver 414 of the lighting fixture 410 and/or the master LED drivers 424A, 434A of the lighting fixtures 420, 430 for turning the lighting fixtures on and off and/or adjusting at least one of the intensity, color, and color temperature of the cumulative light emitted by the respective lighting fixture. The master LED drivers 424A, 434A may be configured to transmit digital messages (e.g., including the feedback from the master LED drivers and feedback received from the slave LED drivers) to the system controller 440.

The load control system 400 may comprise one or more input devices, e.g., such as a remote control device 450, an occupancy sensor 452, and/or a daylight sensor 454, which may operate in a similar manner as respective input devices of the load control systems 200, 300 shown in FIGS. 2 and 3. The input devices may be configured to transmit digital messages directly to the system controller 440 via RF signals 406. The load control system 400 may also comprise a wireless adapter device 456 configured to transmit digital messages to the system controller 440 via the communication link 404 in response to a digital message received from the input devices via the RF signals 406.

During a setup and commissioning procedure of the load control system 400, the system controller 440 may be configured to assign a unique link address to the LED driver 414 of the lighting fixture 410 and the master LED drivers 424A, 434A of the lighting fixtures 420, 430 for use in communication during normal lighting control operation of the load control system 400. For example, the system controller 440 may assign a first link address to the LED driver 414 of the lighting fixture 410, a second link address to the master LED driver 424A of the lighting fixture 420, and a third link address to the master LED driver 434A of the lighting fixture 430.

The slave LED drivers of each of the lighting fixtures 420, 430 may each be assigned a unique slave address that uniquely identifies the slave LED drivers within the respective lighting fixture. For example, the unique slave addresses may be assigned to the LED drivers during a configuration procedure at an OEM or by the master LED drivers 424A, 434A after installation. The master LED drivers 424A, 434A may use the unique slave addresses to individually control the respective slave LED drivers.

The master LED drivers 424A, 434A may be assigned a color engine for appropriately controlling the LED light sources in the respective lighting fixture 420, 430 to the correct color (e.g., the correct color temperature), for example, during the configuration procedure at the OEM. The color engine may define a fixed color, color temperature, color trajectory, color map, hue, saturation, and/or RGB value. The master LED drivers 424A, 434A may send instructions to respective slave LED drivers 434B, 434C, for controlling the respective LED light source(s) to achieve a desired color, color temperature, color trajectory, color mapping, hue, saturation, and/or RGB colors for lighting fixtures 420, 430. In an example, the master LED drivers 424A, 434A may send instructions to the address(es) (e.g., sub-addresses) of respective slave LED drivers 434B, 434C, for controlling the intensities of each of the respective LED light sources. This may allow legacy LED drivers to be used in certain implementations.

Each of the master LED drivers 424A, 434A may be assigned a color engine for controlling the LED light source directly coupled to the master LED driver, and each of the slave LED drivers may be assigned a respective color engine for controlling LED light source directly coupled to the slave LED driver. Though FIG. 4 shows a master driver 424A, 434A directly controlling a single LED, the master drivers 424A, 434A may directly control multiple LEDs. Though FIG. 4 shows the master drivers 424A, 434A directly controlling LEDs of a certain color, the master drivers 424A, 434A may directly control LEDs of other colors.

In contrast to multi-channel LED drivers for controlling multi-channel lighting fixtures, the load control systems 200, 300, 400 of FIGS. 2-4 may each provide a modular solution for providing multi-channel lighting fixtures since each of the multi-channel lighting fixtures each include multiple LED drivers for controlling the respective LED light sources. The multi-channel lighting fixtures may each comprise more than three LED drivers for controlling more than three LED light sources, for example, as many LED drivers as desired to produce the desired color (e.g., the desired color temperature) of the cumulative light and/or output power range. Each of the LED drivers may be sized correctly (e.g., with the correct power rating) depending upon the LED light source to be controlled and the desired contribution of that LED light source on the cumulative light emitted by the lighting fixture. If one of the LED drivers of a multi-channel lighting fixture happens to fail, the light fixture may still emit light since the other LED drivers may still be operating correctly.

Figure 5A:
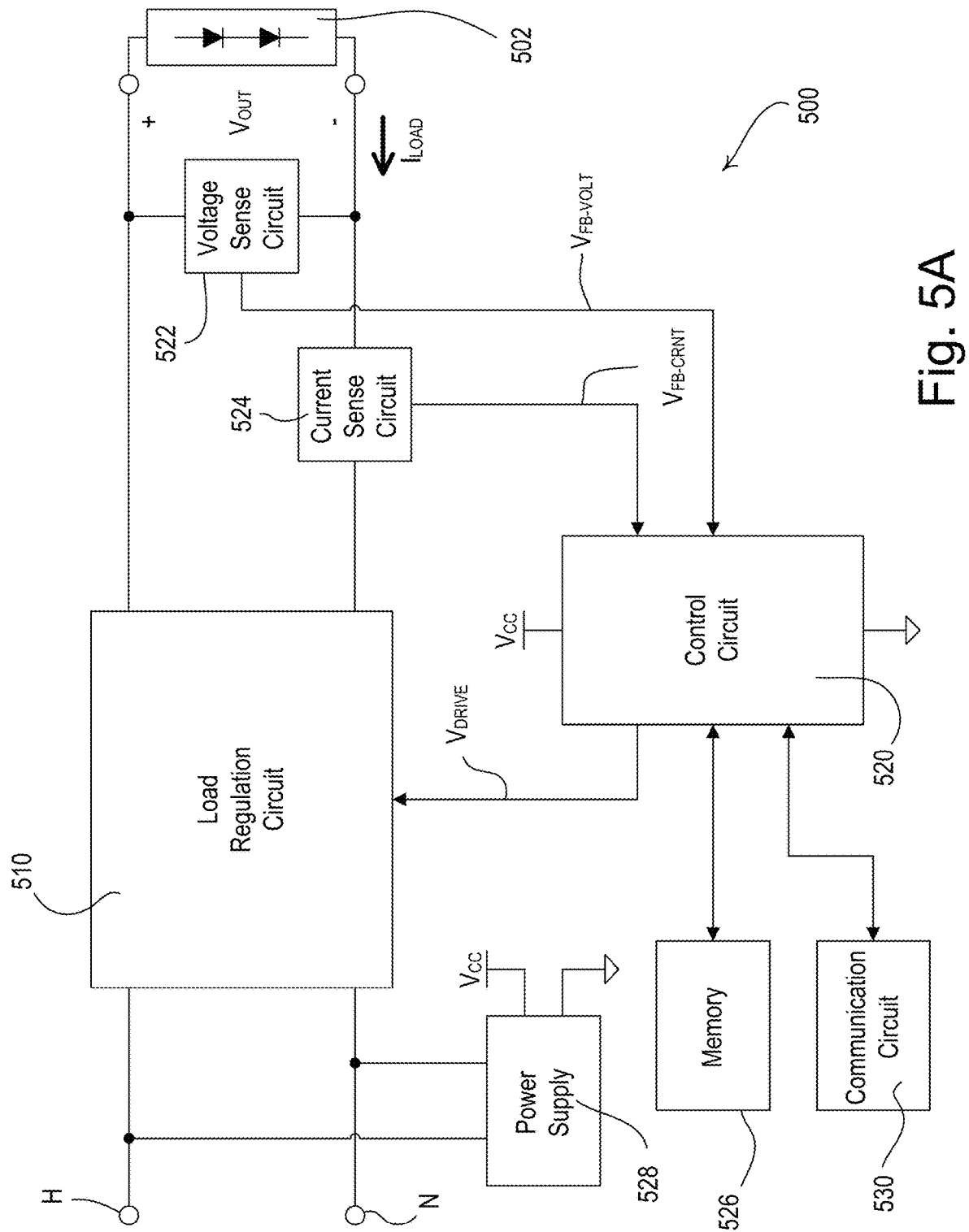
FIGS. 5A and 5B are simplified block diagrams of load regulation devices, such as LED drivers for controlling the intensities of LED light sources in a multiple-driver lighting fixture.

FIG. 5A is a simplified block diagram of an example load regulation device, e.g., an LED driver 500, which may be deployed as one of the LED drivers in the load control systems 200, 300 shown in FIGS. 2 & 3. The LED driver 500 of FIG. 5A may be deployed as one of the slave LED drivers in the load control system 400 of FIG. 4. The LED driver 500 may be arranged to control the amount of power delivered to an electrical load, such as, an LED light source 502, and thus the intensity of the LED light source. The LED driver 500 may comprise a hot terminal H and a neutral terminal N that are adapted to be coupled to a power source, e.g., an AC power source.

The LED driver 500 may comprise a load regulation circuit 510, which may control the amount of power delivered to the LED light source 502 so as to control the intensity of the LED light source between a low-end (e.g., minimum) intensity $L_{LE}$ (e.g., approximately 1-5%) and a high-end (e.g., maximum) intensity $L_{HE}$ (e.g., approximately 100%). The load regulation circuit 510 may comprise, for example, a forward converter, a boost converter, a buck converter, a flyback converter, a linear regulator, or any suitable LED drive circuit for adjusting the intensity of the LED light source 502. Examples of load regulation circuits for LED drivers are described in greater detail in commonly-assigned U.S. Pat. No. 8,492,987, issued Jul. 23, 2010, and U.S. Patent Application Publication No. 2014/0009085, published Jan. 9, 2014, both entitled LOAD CONTROL DEVICE FOR A LIGHT-EMITTING DIODE LIGHT SOURCE, the entire disclosures of which are hereby incorporated by reference in their entireties.

The LED driver 500 may comprise a control circuit 520, e.g., a controller, for controlling the operation of the load regulation circuit 510. The control circuit 520 may comprise, for example, a digital controller or any other suitable processing device, such as, for example, a microcontroller, a programmable logic device (PLD), a microprocessor, an application specific integrated circuit (ASIC), or a field-programmable gate array (FPGA).

The control circuit 520 may generate a drive control signal $V_{DRIVE}$ that is provided to the load regulation circuit 510 for adjusting the magnitude of a load voltage $V_{LOAD}$ generated across the LED light source 502 and/or the magnitude of a load current $I_{LOAD}$ conducted through the LED light source to thus control the intensity of the LED light source to a target intensity $L_{TRGT}$. The LED driver 500 may further comprise a voltage sense circuit 522 (which may generate a load voltage feedback signal $V_{FB-VOLT}$ that may be indicative of the magnitude of the load voltage $V_{LOAD}$) and/or a current sense circuit 524 (which may generate a load current feedback signal $V_{FB-CRNT}$ that may be indicative of the magnitude of the load current $I_{LOAD}$). The control circuit 520 may receive the voltage feedback signal $V_{FB-VOLT}$ and the load current feedback signal $V_{FB-CRNT}$, and control the drive control signal $V_{DRIVE}$ to adjust the magnitude of the load voltage $V_{LOAD}$ and/or the magnitude of the load current $I_{LOAD}$ to control the intensity of the LED light source 502 to the target intensity $L_{TRGT}$. The control circuit 520 may be configured to control the load regulation circuit 510 to pulse-width modulate the load voltage $V_{LOAD}$ and/or the load current $I_{LOAD}$ to adjust the intensity of the LED light source 502.

The control circuit 520 may be coupled to a memory 526 for storing the operational characteristics of the LED driver 500 (e.g., the target intensity $L_{TRGT}$, the low-end intensity $L_{LE}$, the high-end intensity $L_{HE}$, the link address, the slave address, the fixture address and/or serial number, the color engine, etc.). The LED driver 500 may further comprise a power supply 528, which generates a direct-current (DC) supply voltage $V_{CC}$ for powering the circuitry of the LED driver.

The LED driver 500 may also comprise a communication circuit 530, which may be coupled to a digital communication link, for example, a wired communication link or a wireless communication link, such as a radio-frequency (RF) communication link or an infrared (IR) communication link. The control circuit 520 may be configured to use the color engine stored in the memory 526 to update the target intensity $L_{TRGT}$ of the LED light source 502 in dependence upon a command included in a single digital message received via the communication circuit 530. The control circuit 520 may be configured to update the operational characteristics stored in the memory 526 in response to digital messages received via the communication circuit 530. The LED driver 500 may be configured to receive a phase-control signal from a dimmer switch for determining the target intensity $L_{TRGT}$ for the LED light source 502.

Figure 5B:
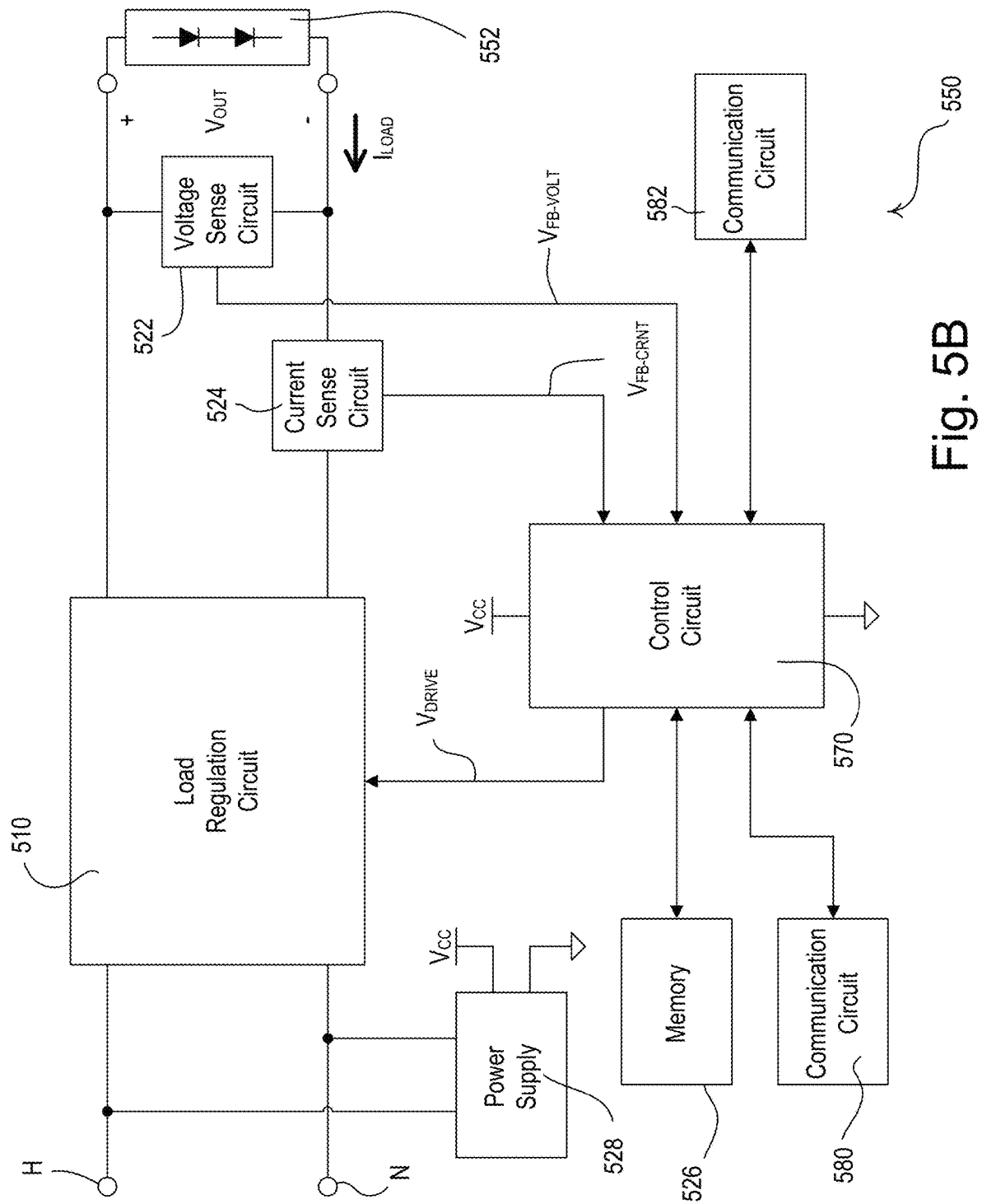

FIG. 5B is a simplified block diagram of another example load regulation device, e.g., an LED driver 550, which may be deployed as the one of the master LED drivers 424A, 434A in the load control system 400 shown in FIG. 4. The LED driver 550 may be arranged to control the amount of power delivered to an electrical load, such as, an LED light source 552 (e.g., one of the LED light sources 422A, 432A), and thus the intensity of the LED light source. The LED driver 550 of FIG. 5B is similar to the LED driver 500 of FIG. 5a. The LED driver 550 comprises a control circuit 570 and communication circuits 580, 582. The communication circuit 580 may be similar to the communication circuit 430 of the LED driver 400 shown in FIG. 4. The communication circuit 580 may be coupled to a digital communication link, for example, a wired communication link or a wireless communication link, such as a radio-frequency (RF) communication link or an infrared (IR) communication link. The control circuit 570 may be configured to transmit and/or receive digital messages on the communication link via the communication circuit 580. The communication circuit 582 may allow for control of one or more slave LED drivers via a fixture control link (e.g., the fixture control links 428, 438 shown in FIG. 4). The control circuit 570 may be configured to use the color engine stored in the memory 576 to control the LED light source 552 and/or the slave LED drivers coupled to the communication circuit 582 in dependence upon a command included in a single digital message received via the communication circuit 580.

Figure 6:
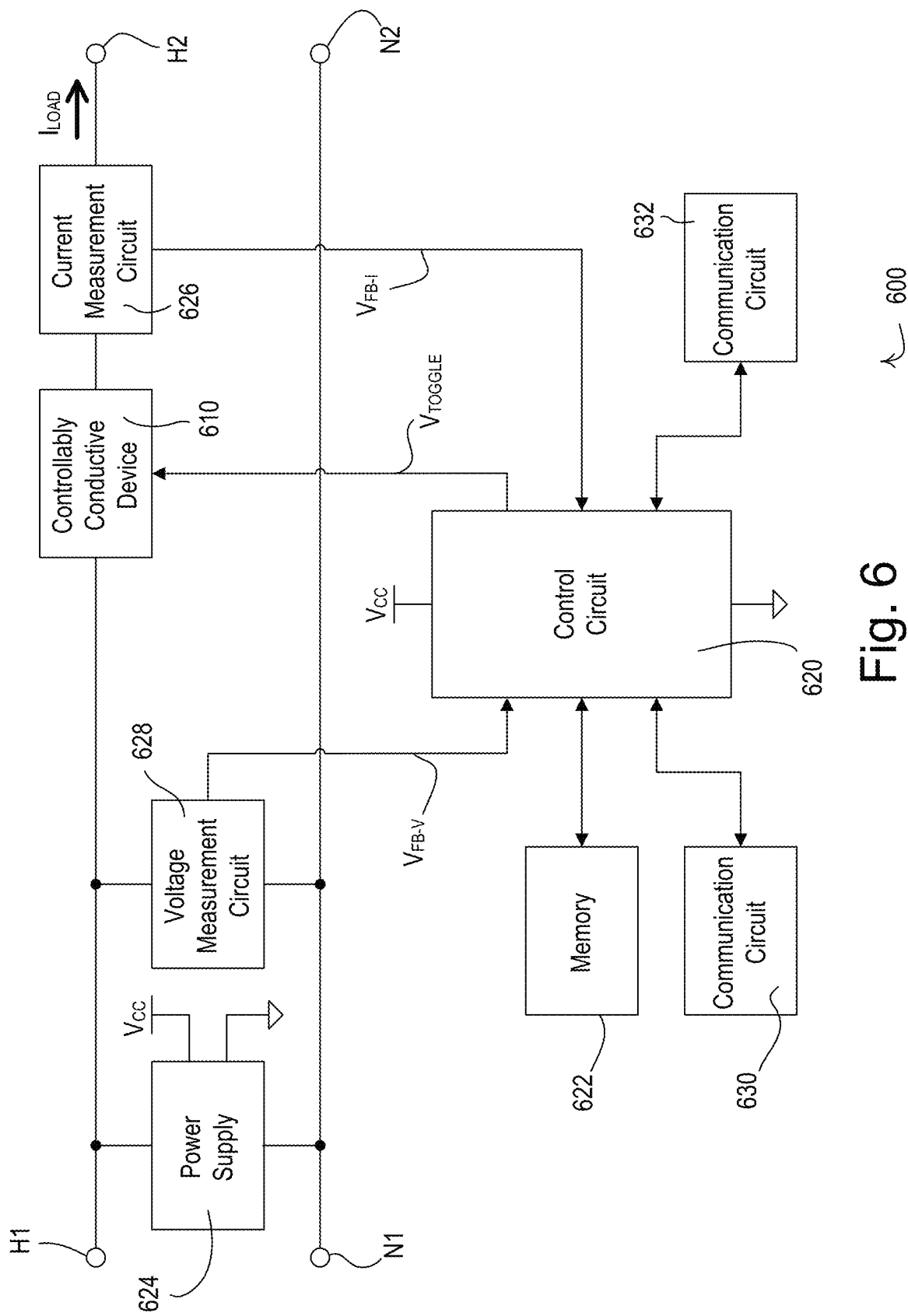
FIG. 6 is a simplified block diagram of an example control module for controlling LED drivers in a multiple-driver lighting fixture.

FIG. 6 is a simplified block diagram of an example control module 600, which may be deployed as one of the control modules 326, 336 of the load control system 300 shown in FIG. 3. The control module 600 may be adapted to be coupled in series electrical connection between a power source (e.g., an AC power source) and one or more load regulation devices (e.g., the LED drivers of the load control system 300 shown in FIG. 3) for controlling respective lighting loads in a multiple-driver lighting fixture. The control module 600 may comprise an input hot terminal H1 and an input neutral terminal N1 adapted to be electrically coupled to the AC power source for receiving a line voltage. The control module 600 may comprise an output power connection including an output hot terminal H2 and an output neutral terminal N2 adapted to be coupled to the load regulation device.

The control module 600 may comprise a controllably conductive device 610 coupled in series electrical connection between the input hot terminal H1 and the output hot terminal H2 for controlling the power delivered to the load regulation device. The controllably conductive device 610 may comprise, for example, a relay, a bidirectional semiconductor switch (such as, a triac, a FET in a rectifier bridge, two FETs in anti-series connection, or one or more insulated-gate bipolar junction transistors), or any other suitable switching circuit. The controllably conductive device 610 may be configured to conduct a load current $I_{LOAD}$ to the load regulation device and the lighting load. The input neutral terminal N1 may be coupled directly to the output neutral terminal N2.

The control module 600 may comprise a control circuit 620 that may be coupled to the controllably conductive device 610 for rendering the controllably conductive device conductive and/or non-conductive to control the power delivered to the driver and lighting load. For example, the control circuit 620 may comprise a microcontroller, a programmable logic device (PLD), a microprocessor, an application specific integrated circuit (ASIC), a field-programmable gate array (FPGA), or any suitable processing device, controller, or control circuit. The control circuit 620 may be coupled to a memory 622 for storing the operational characteristics of the control module 600 (e.g., the link address, the color engine, etc.). The control module 300 may further comprise a power supply 624 coupled between the input hot terminal H1 and the input neutral terminal N1 for generating a direct-current (DC) supply voltage $V_{CC}$ for powering the control circuit 620 and the other low-voltage circuitry of the control module 600.

The control module 600 may comprise a current measurement circuit 626 coupled in series electrical connection between the input hot terminal H1 and the output hot terminal H2 for measuring the magnitude of the load current $I_{LOAD}$ conducted through the load regulation device and the lighting load. The current measurement circuit 626 may generate a current feedback signal $V_{FB-I}$ indicating the magnitude of load current $I_{LOAD}$ presently being conducted through the load regulation device and the lighting load. For example, the current measurement circuit 626 may comprise a sense resistor (not shown) for generating a sense voltage (e.g., the current feedback signal $V_{FB-I}$) in response to the load current $I_{LOAD}$ being conducted through the sense resistor. The control circuit 620 may receive the current measurement signal $V_{FB-I}$ for determining the magnitude of the load current $I_{LOAD}$ being conducted through the load regulation device and the lighting load.

The control module 600 may comprise a voltage measurement circuit 628 coupled between the input hot terminal H1 and the input neutral terminal N1 for measuring the magnitude of the line voltage of the AC power source. The voltage measurement circuit 628 may generate a voltage feedback signal $V_{FB-V}$ indicating the present magnitude of the line voltage of the AC power source. For example, the voltage measurement circuit 628 may comprise a resistor divider for generating a scaled voltage (e.g., the voltage feedback signal $V_{FB-V}$). The control circuit 620 may receive the voltage measurement signal $V_{FB-V}$ and may calculate the amount of power presently being consumed by the driver and/or lighting load using the present magnitude of the line voltage and the present magnitude of load current $I_{LOAD}$ as measured by the current measurement circuit 626.

The control module 600 further comprises a communication circuit 630, which may be similar to the communication circuits 430, 530 of the LED drivers 400, 500 shown in FIGS. 4 and 5. The communication circuit 630 may be coupled to a digital communication link, for example, a wired communication link or a wireless communication link, such as a radio-frequency (RF) communication link or an infrared (IR) communication link. The control circuit 620 may be configured to transmit and receive digital messages on the communication link via the communication circuit 630. The control module 600 may also comprise a communication circuit 632 adapted to be coupled to one or more LED drivers via a fixture control link (e.g., the fixture control links 328, 338 shown in FIG. 3). The control circuit 620 may be configured to use the color engine stored in the memory 622 to control the LED drivers coupled to the communication circuit 632 in dependence upon a command included in a single digital message received via the communication circuit 630.

Figure 7:
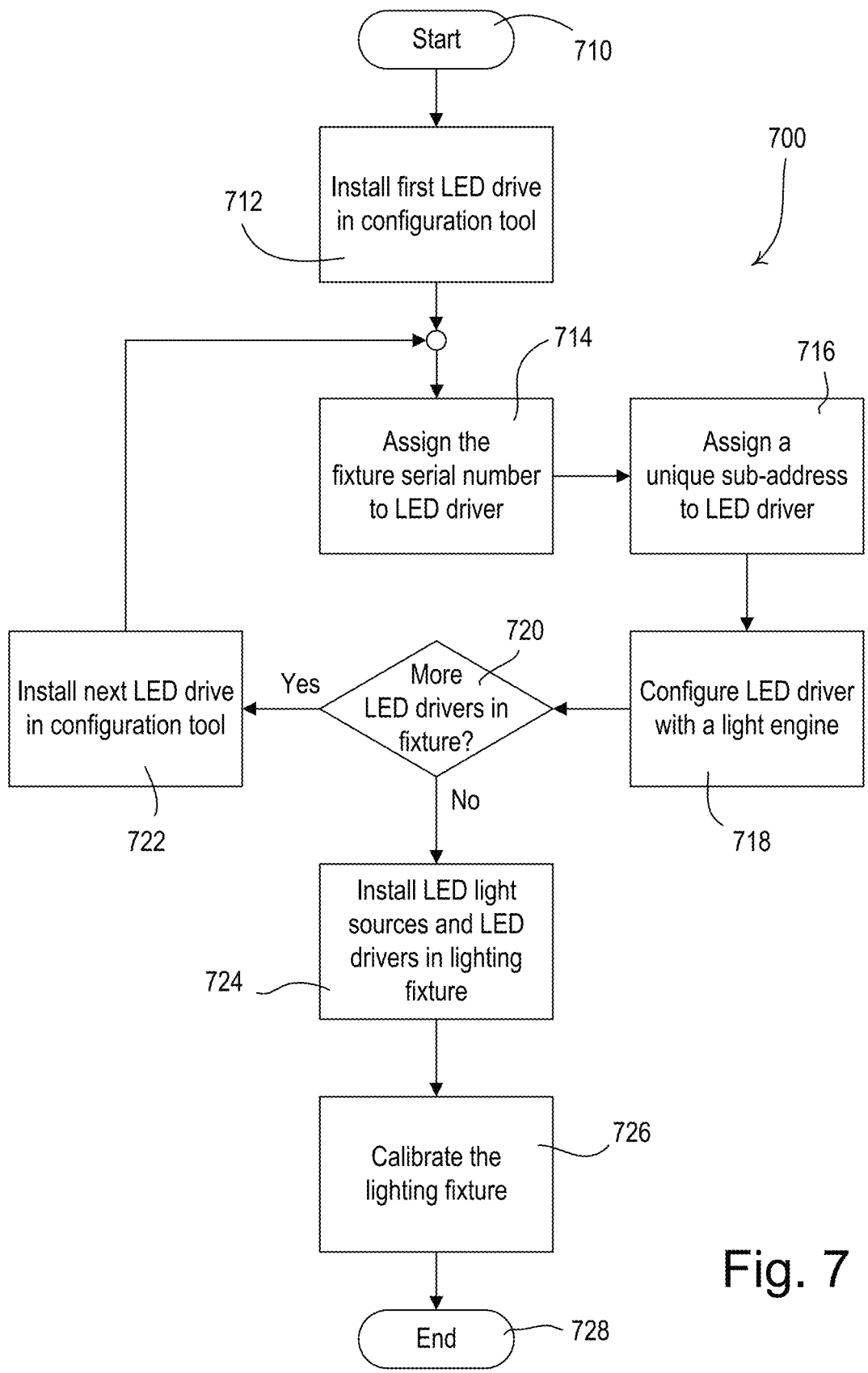
FIG. 7 is a simplified flowchart of an example configuration procedure for configuring a multiple-driver lighting fixture having multiple LED light sources and respective LED drivers.

FIG. 7 is a simplified flowchart of an example configuration procedure 700 for configuring a multiple-driver lighting fixture having multiple LED light sources and respective LED drivers. For example, the LED light sources may comprise different color LED light sources and the LED drivers may be configured to control the LED light sources to control an intensity, color, and/or color temperature of a cumulative light emitted by the multiple-driver lighting fixture. The configuration procedure 700 may be executed at step 710, for example, using a configuration tool at an OEM. At step 712, the first LED driver to be installed in the lighting fixture may be first inserted into the configuration tool. The configuration tool may assign a fixture serial number to the LED driver at step 714 (e.g., the same fixture serial number for each of the LED drivers in the lighting fixture), and may assign a unique sub-address to the LED driver at step 716 (e.g., depending upon what color LED light source the LED driver is controlling). The configuration tool may configure the LED driver with an appropriate light engine (e.g., color engine) at step 718 depending upon the desired control technique for the lighting fixture (e.g., fixed color temperature, color trajectory, or color map). If there are more LED drivers to configure in the lighting fixture at step 720, the next LED driver may be installed in the configuration tool at step 722, and the procedure may loop around to assign the fixture serial number, a unique sub-address, and a color engine to the next LED driver. When there are no more LED drivers in the lighting fixture to configure at step 720, the LED light sources and LED drivers may be installed in the lighting fixture at step 724 and the lighting fixture may be calibrated at step 726, before the configuration procedure 700 ends at step 728.

Figure 8:
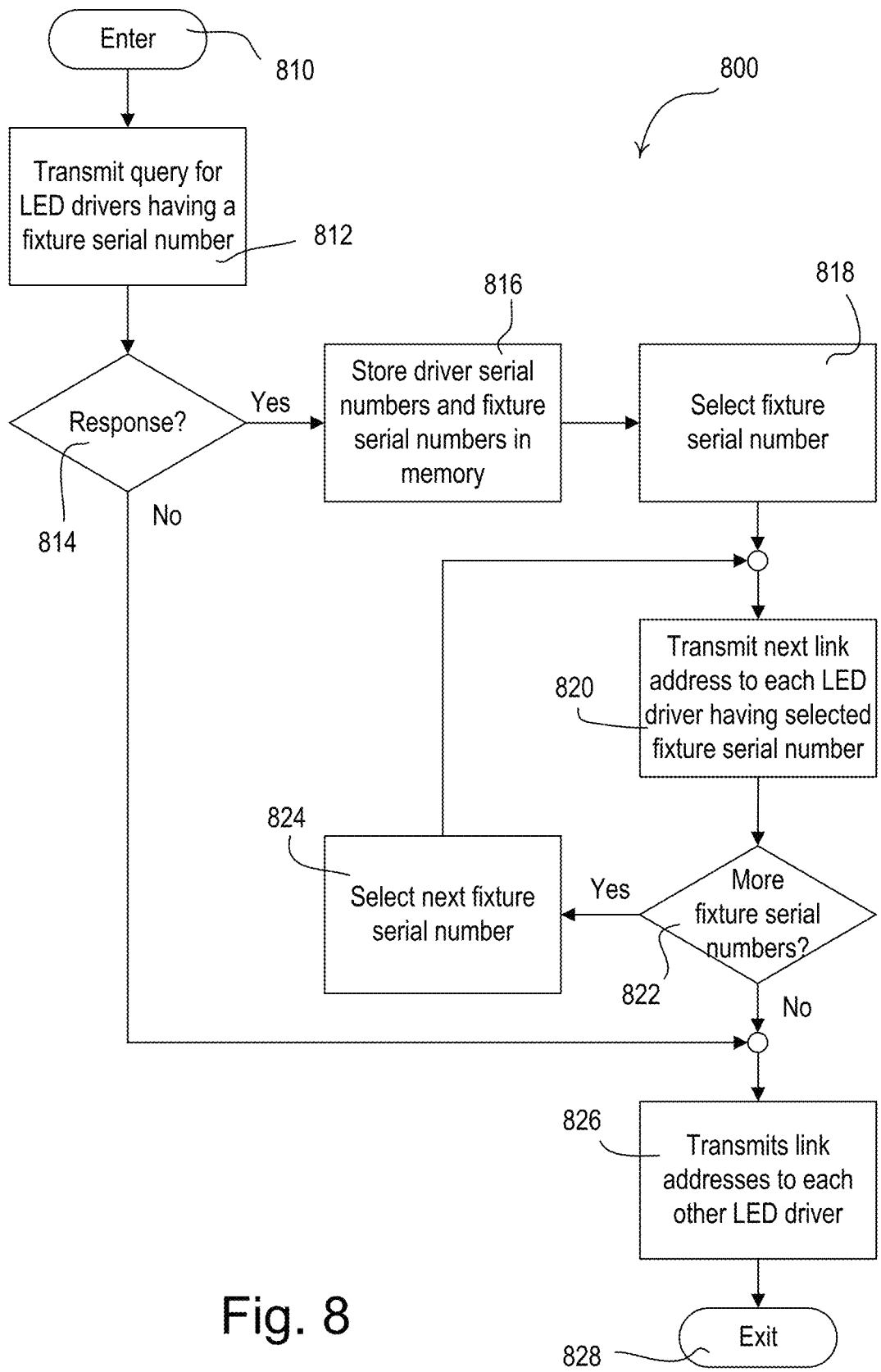
FIG. 8 is a simplified flowchart of an example setup procedure for programming the operation of a load control system having multiple-driver lighting fixtures.

FIG. 8 is a simplified flowchart of an example setup procedure 800 for programming the operation of a load control system having multiple-driver lighting fixtures (e.g., the load control system 200 of FIG. 2). For example, the setup procedure 800 may be executed by a system controller of the load control system (e.g., the system controller 240). After the setup procedure 800 is initiated at step 810, the system controller may transmit a query message to a plurality of LED drivers on a digital communication link at step 812. The query message may request responses from LED drivers that are assigned a fixture serial number (e.g., LED drivers that are installed in multiple-driver lighting fixtures). The response may include the fixture serial number and/or corresponding driver serial numbers of the LED drivers that received the query. If the system controller receives a response from any of the LED drivers at step 814, the system controller may store the driver serial numbers and corresponding fixture serial numbers in memory at step 816.

The system controller may assign a link address to each of the LED drivers for identified fixtures. At step 818, the system controller may select one of the fixture serial numbers from which the system controller received responses at step 814. The system controller may transmit the next free link address to each of the LED drivers having the selected fixture serial number at step 820. If there are more fixture serial numbers stored in memory at step 822, the system controller may select the next fixture serial number at step 824 and transmit the next free link address to each of the LED drivers having that fixture serial number at step 820. If there are not more fixture serial numbers at step 822, the system controller may transmit link addresses to each of the other LED drivers (e.g., a different link address to each LED driver) at step 826, before the setup procedure 800 exits at step 828.

Figure 9:
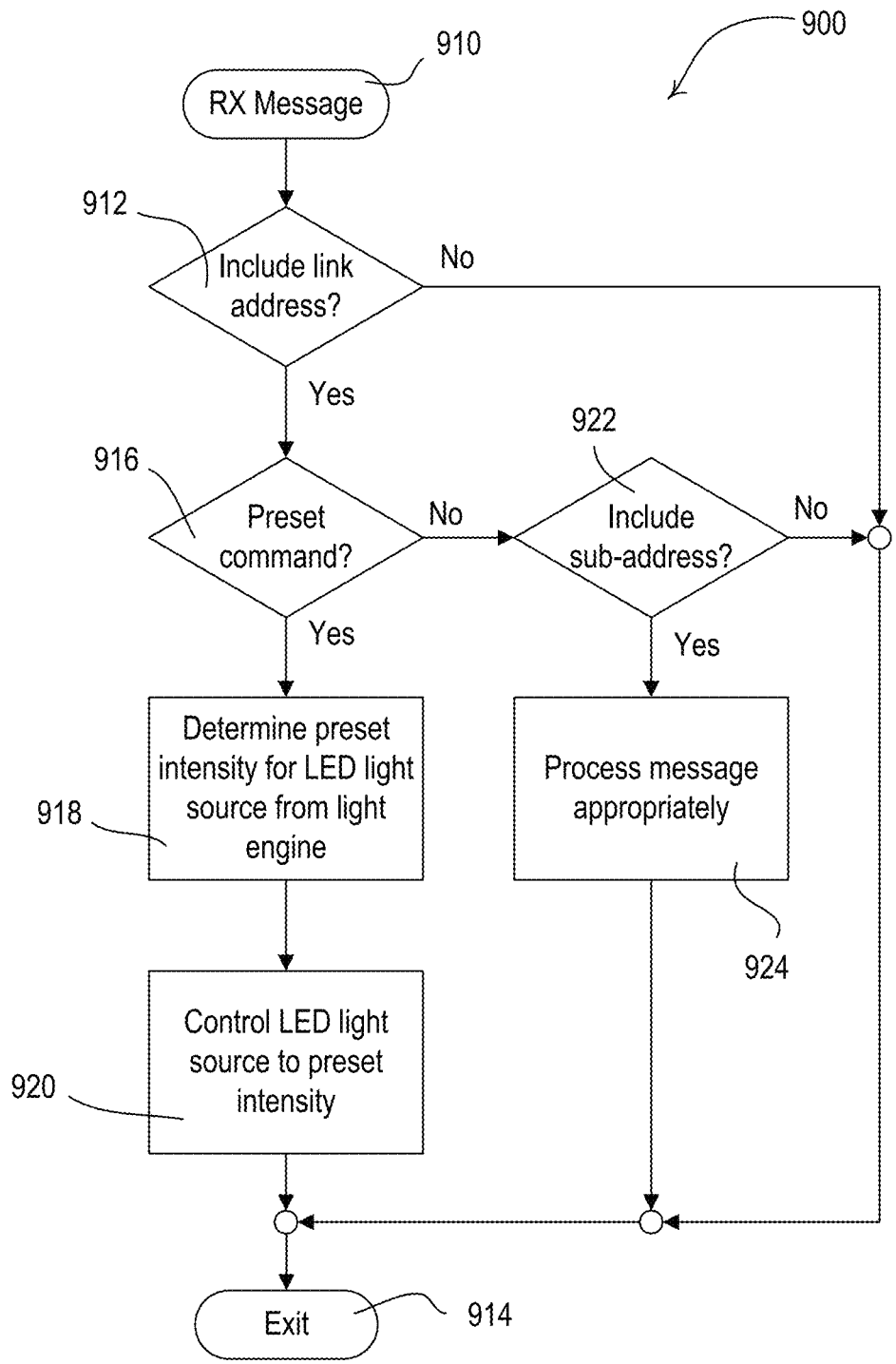
FIG. 9 is a simplified flowchart of an example message processing procedure that may be executed by an LED driver of a multiple-driver lighting fixture.

FIG. 9 is a simplified flowchart of an example message processing procedure 900, which may be executed by an LED driver (e.g., one of the LED drivers of the load control system 200 shown in FIG. 2). The message processing procedure 900 may be executed by a control circuit of the LED driver when the LED driver receives a digital message via a digital communication link at step 910. If the received digital message does not include the link address of the LED driver at step 912, the message processing procedure 900 may simply exit at step 914. If the received digital message includes the link address of the LED driver at step 910 and the digital message includes a preset command (e.g., a parameter indicating for the LED driver to go-to a specific color temperature) at step 916, the LED driver may determine the appropriate preset intensity for the controlled LED light source using a light engine (e.g., a color engine) stored in memory at step 918 and then control the intensity of the LED light source to that preset intensity at step 920, before the message processing procedure 900 exits at step 914. If the received digital message does not include a preset command at step 916, the LED driver may determine if the digital message includes the sub-address of the LED driver at step 922. If so, the LED driver may process the digital message at step 924 and the message processing procedure 900 may exit at step 914.

Figure 10:
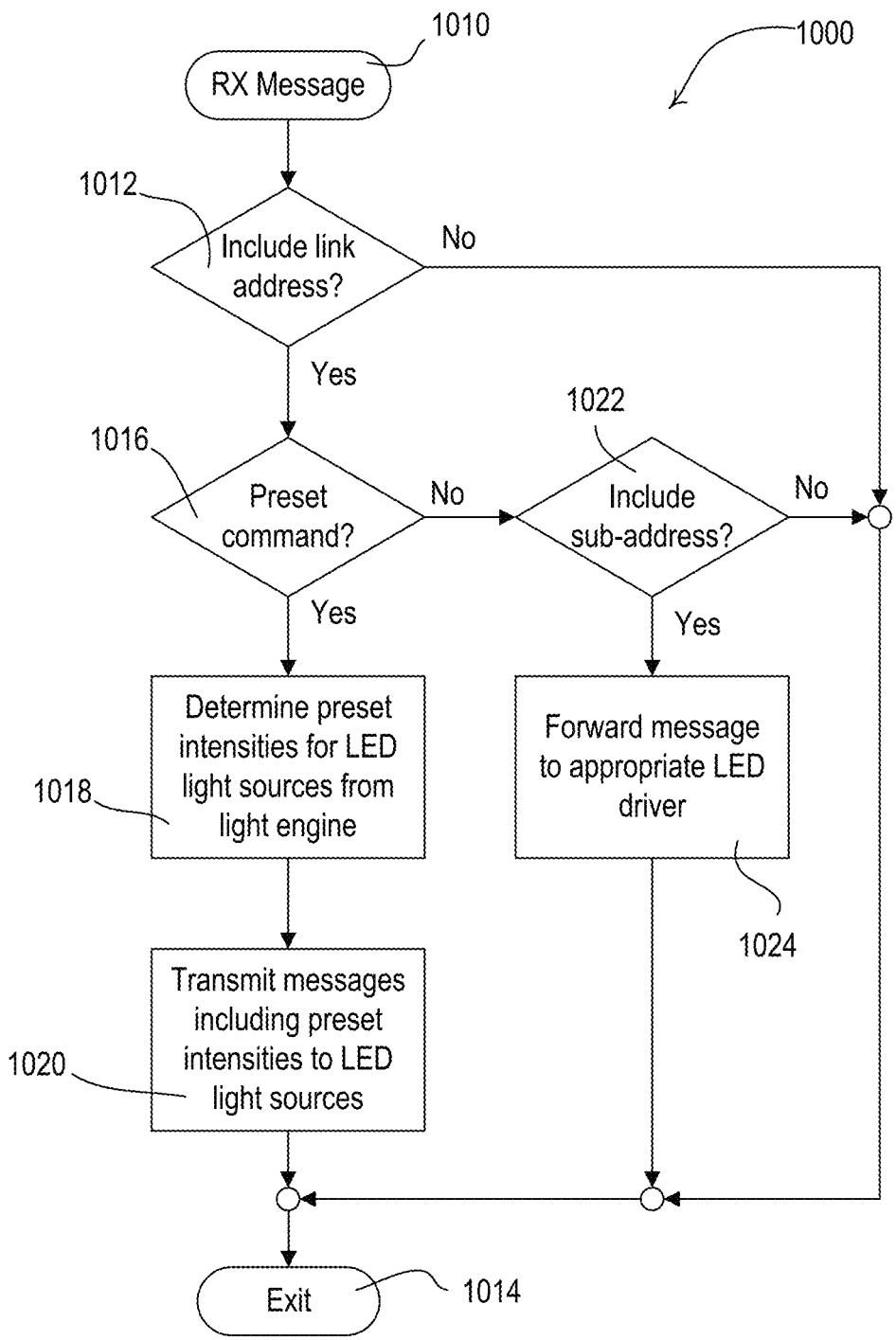
FIG. 10 is a simplified flowchart of an example message processing procedure that may be executed by a control module of a multiple-driver lighting fixture.

FIG. 10 is a simplified flowchart of another example message processing procedure 1000, which may be executed by a control module (e.g., one of the control modules 326, 336 of the load control system 300 shown in FIG. 3). The message processing procedure 1000 may be executed by a control circuit of the control module when the control module receives a digital message via a digital communication link at step 1010. If the received digital message does not include the link address of the control module at step 1012, the message processing procedure 1000 may simply exit at step 1014. If the received digital message includes the link address of the control module at step 1010 and the digital message includes a preset command (e.g., go-to a specific color temperature) at step 1016, the control module may determine the appropriate preset intensities for each of the controlled LED light sources in the lighting fixture using a light engine (e.g., a color engine) stored in memory at step 1018. The control module may then transmit a digital message including the appropriate intensity to each of the LED light sources at step 1020, before the message processing procedure 1000 exits at step 1014. If the received digital message does not include a preset command at step 1016, the control module may determine if the digital message includes the sub-address of one of the LED drivers in the lighting fixture at step 1022. If so, the control module may forward the digital message onto the appropriate LED driver at step 1024 and the message processing procedure 1000 may exit at step 1014.

Figure 11:
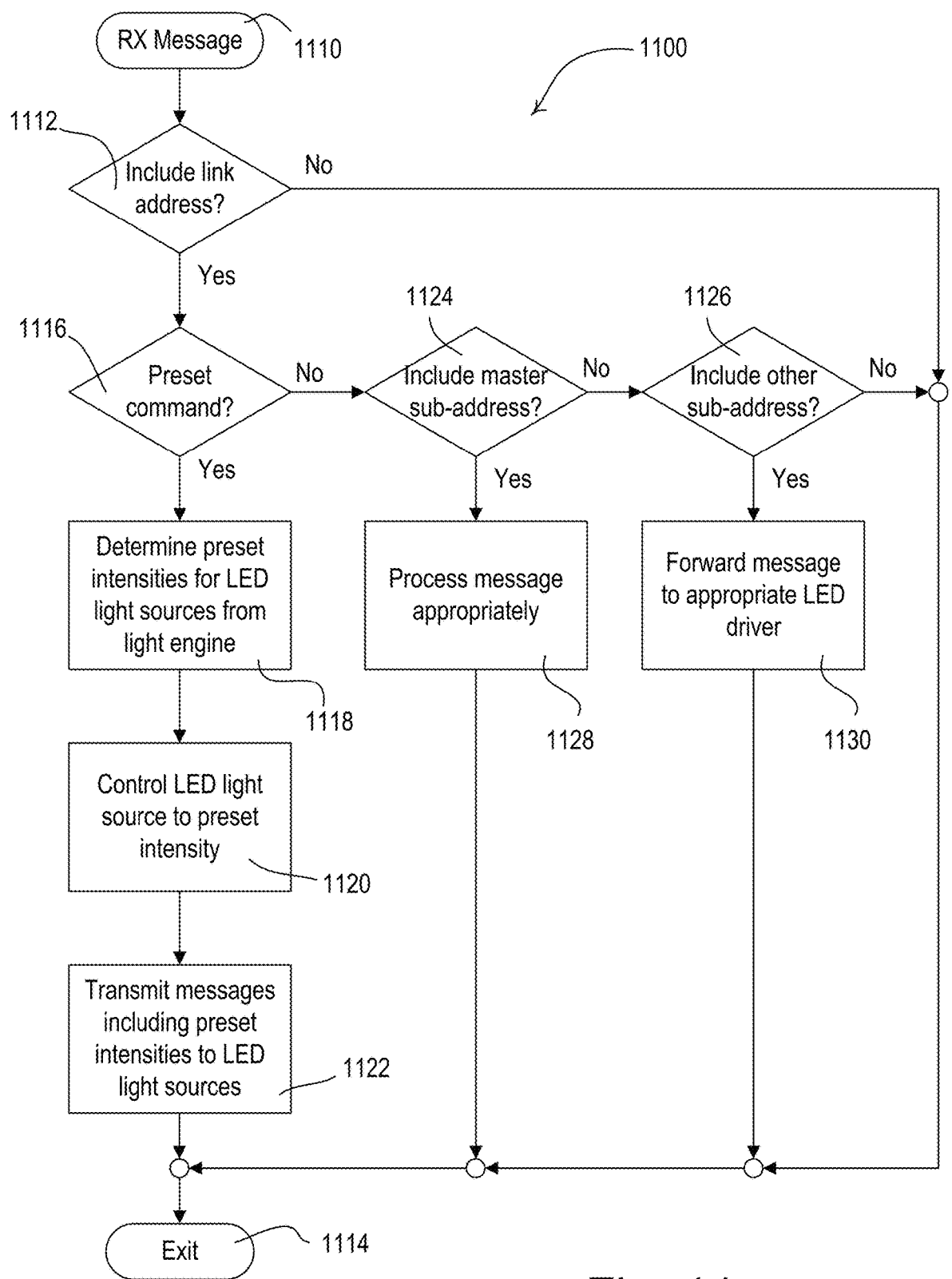
FIG. 11 is a simplified flowchart of an example message processing procedure that may be executed by a master LED driver of a multiple-driver lighting fixture.

FIG. 11 is a simplified flowchart of an example message processing procedure 1100, which may be executed by a master LED driver (e.g., one of the master LED drivers 424A, 434A of the load control system 400 shown in FIG. 4). The message processing procedure 1100 may be executed by a control circuit of the master LED driver when the master LED driver receives a digital message via a digital communication link at step 1110. If the received digital message does not include the link address of the control module at step 1112, the message processing procedure 1100 may simply exit at step 1114. If the received digital message includes the link address of the master LED driver at step 1110 and the digital message includes a preset command (e.g., a parameter indicating for the LED driver go-to a specific color temperature) at step 1116, the master LED driver may determine the appropriate preset intensities for each of the controlled LED light sources in the lighting fixture using a light engine (e.g., a color engine) stored in memory at step 1118. The master LED driver may control the intensity of the LED light source directly coupled to the master LED driver to the appropriate preset intensity at step 1120 and transmit a digital message including the appropriate intensity to each of the slave LED light sources at step 1022, before the message processing procedure 1100 exits at step 1114. If the received digital message does not include a preset command at step 1116, the master LED driver may determine if the digital message includes its sub-address at step 1124 or a sub-address of one of the slave LED drivers in the lighting fixture at step 1126. If the digital message includes the sub-address of the master LED driver at step 1124, the master LED driver may process the digital message at step 1128 and the message processing procedure 1100 may exit at step 1114. If the digital message includes a sub-address of one of the slave LED drivers in the lighting fixture at step 1126, the master LED driver may forward the digital message onto the appropriate LED driver at step 1130 and the message processing procedure 1100 may exit at step 1114.

Figure 12:
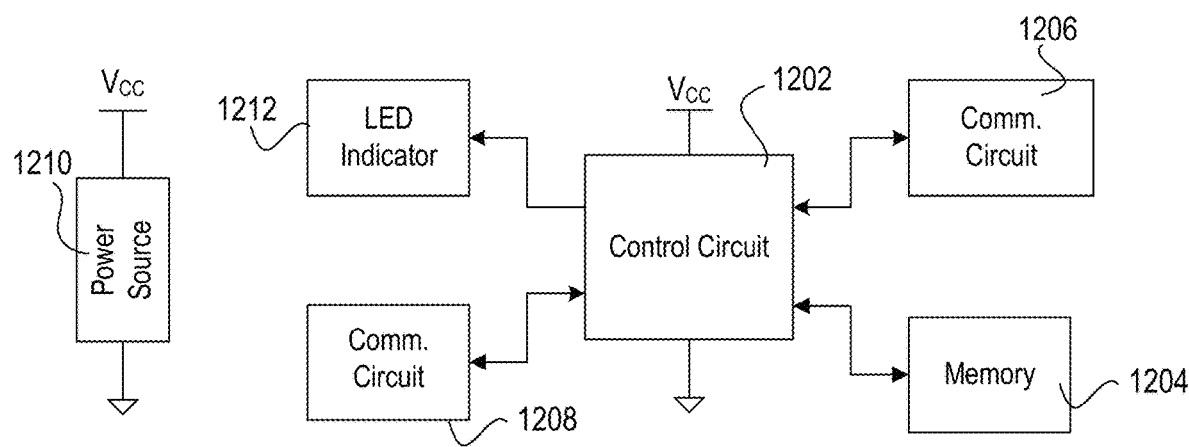
FIG. 12 is a block diagram of an example system controller.

FIG. 12 is a block diagram illustrating an example system controller 1200 as described herein. The system controller 1200 may include a control circuit 1202 for controlling the functionality of the system controller 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 1202 may perform signal coding, data processing, power control, input/output processing, or any other functionality that enables the system controller 1200 to perform as described herein. The control circuit 1202 may store information in and/or retrieve information from the memory 1204. The memory 1204 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1200 may include a communications circuit 1206 for transmitting and/or receiving information. The communications circuit 1206 may perform wireless and/or wired communications. The system controller 1200 may also, or alternatively, include a communications circuit 1208 for transmitting and/or receiving information. The communications circuit 1206 may perform wireless and/or wired communications. Communications circuits 1206 and 1208 may be in communication with control circuit 1202. The communications circuits 1206 and 1208 may include RF transceivers or other communications modules capable of performing wireless communications via an antenna. The communications circuit 1206 and communications circuit 1208 may be capable of performing communications via the same communication channels or different communication channels. For example, the communications circuit 1206 may be capable of communicating (e.g., with input devices, over a network, etc.) via a wireless communication channel (e.g., BLUETOOTH®, near field communication (NFC), WIFI®, WI-MAX®, cellular, etc.) and the communications circuit 1208 may be capable of communicating (e.g., with control devices and/or other devices in the load control system) via another wired or wireless communication channel (e.g., WI-FI® or a proprietary communication channel, such as CLEAR CONNECT™).

The control circuit 1202 may be in communication with an LED indicator 1212 for providing indications to a user. The control circuit 1202 may be in communication with an actuator 1214 (e.g., one or more buttons) that may be actuated by a user to communicate user selections to the control circuit 1202. For example, the actuator 1214 may be actuated to put the control circuit 1202 in an association mode and/or communicate association messages from the system controller 1200.

Each of the modules within the system controller 1200 may be powered by a power source 1210. The power source 1210 may include an AC power supply or DC power supply, for example. The power source 1210 may generate a supply voltage V$_{CC}$ for powering the modules within the system controller 1200.

Figure 13:
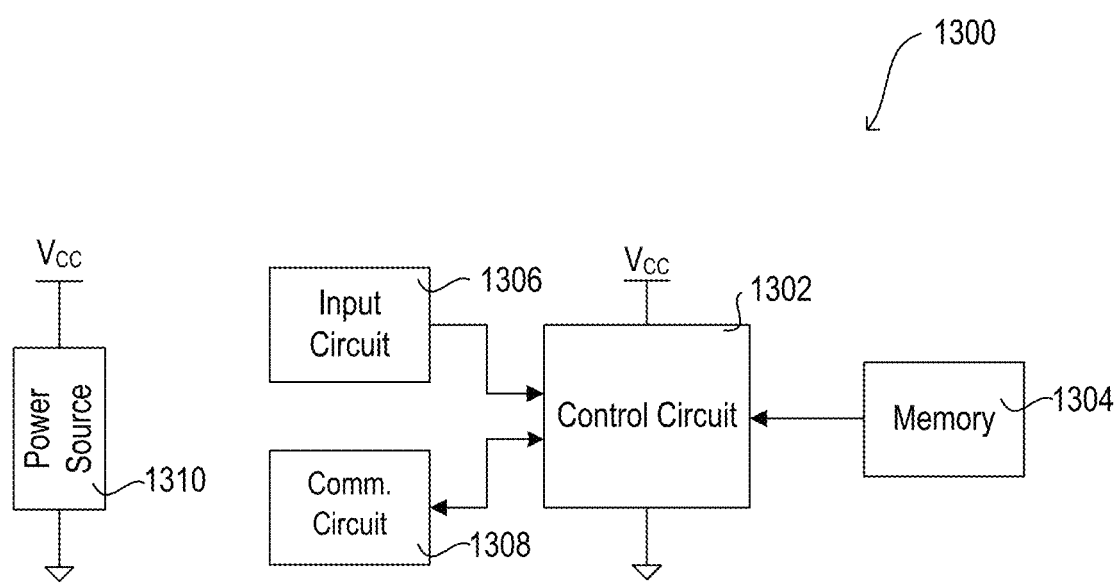
FIG. 13 is a block diagram of an example input device.

FIG. 13 is a block diagram illustrating an example input device 1300 as described herein. The input device 1300 may be a remote control device, an occupancy sensor, a daylight sensor, a window sensor, a temperature sensor, and/or the like. The input device 1300 may include a control circuit 1302 for controlling the functionality of the input device 1300. The control circuit 1302 may include one or more general purpose processors, special purpose processors, conventional processors, digital signal processors (DSPs), microprocessors, integrated circuits, a programmable logic device (PLD), application specific integrated circuits (ASICs), or the like. The control circuit 1302 may perform signal coding, data processing, power control, input/output processing, or any other functionality that enables the control-source device 1300 to perform as described herein.

The control circuit 1302 may store information in and/or retrieve information from the memory 1304. The memory 1304 may include a non-removable memory and/or a removable memory, as described herein.

The input device 1300 may include a communications circuit 1308 for transmitting and/or receiving information. The communications circuit 1308 may transmit and/or receive information via wired and/or wireless communications. The communications circuit 1308 may include a transmitter, an RF transceiver, or other circuit capable of performing wired and/or wireless communications. The communications circuit 1308 may be in communication with control circuit 1302 for transmitting and/or receiving information.

The control circuit 1302 may also be in communication with an input circuit 1306. The input circuit 1306 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 1306 to put the control circuit 1302 in an association mode and/or communicate association messages from the control-source device. The control circuit 1302 may receive information from the input circuit 1306 (e.g., an indication that a button has been actuated or sensed information). Each of the modules within the input device 1300 may be powered by a power source 1310.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A lighting controller, comprising:
   control circuitry to:
   receive, the via first communication interface circuitry, a first message from a system controller, the first message including link address data and fixture command data;
   determine if the received link address data corresponds to link address data assigned to the control circuitry and stored in communicatively coupled memory circuitry; and
   responsive to the determination that the link address data included in the first message corresponds to the stored link address data assigned to the control circuitry, determine if the fixture command data included in the first message corresponds to fixture preset command data stored in the memory circuitry;
   responsive to the determination that the received fixture command data corresponds favorably to fixture preset command data stored in the memory circuitry:
   retrieve a respective light-emitting diode (LED) driver preset command for each of a plurality of communicatively coupled LED driver circuits from the memory circuitry, the retrieved LED driver preset commands corresponding to the received fixture preset command data; and
   cause a communication, via second communication interface circuitry, of a second message that includes the retrieved preset command data to respective ones of the plurality of communicatively coupled LED driver circuits.

2. The lighting controller of claim 1, the control circuitry to further, responsive to the determination that the received fixture command data does not correspond favorably to fixture preset command data stored in the memory circuitry:

cause a communication, via the second communication interface circuitry, of the received fixture command data to each respective one of the plurality of communicatively coupled LED driver circuits.

3. The lighting controller of claim 1 wherein to retrieve the respective light-emitting diode (LED) driver preset command for each of the plurality of communicatively coupled LED driver circuits from the memory circuitry, the control circuitry to further:
retrieve the respective light-emitting diode (LED) driver preset command for each of the plurality of communicatively coupled LED driver circuits from the memory circuitry, each of the plurality of LED driver circuits operatively coupled to a respective one of a plurality of different color LED emitters.

4. The lighting controller of claim 1 wherein to communicate the second message that includes the retrieved preset command data to respective ones of the plurality of communicatively coupled LED driver circuits, the control circuitry to further:
communicate, via the second communication interface circuitry, a second message that includes a plurality of sub-addresses to each of the plurality of LED driver circuits, each of the plurality of sub-addresses corresponding to a respective one of the plurality of LED driver circuits.

5. The lighting controller of claim 1 wherein to receive the first message from the system controller, the first message including the link address data and the fixture command data, the control circuitry to further:
receive, via the first communication interface circuitry, the first message from the system controller, the first message including the link address data and the fixture command data, wherein the fixture command data includes a color trajectory value of the composite light emitted by LEDs operatively coupled to the plurality of LED driver circuits.

6. The lighting controller of claim 5 wherein to retrieve the respective LED driver preset command for each of the plurality of communicatively coupled LED driver circuits from the memory circuitry, the control circuitry to further:
retrieve a respective color trajectory value of the light emitted by the LEDs operatively coupled to each of the plurality of communicatively coupled LED driver circuits from the memory circuitry.

7. A non-transitory, machine-readable, storage device that includes instructions that, when executed by lighting fixture control circuitry, cause the lighting fixture control circuitry to:
receive, via first communication interface circuitry, a first message from a system controller, the first message including link address data and fixture command data;
determine if the received link address data corresponds to link address data assigned to the control circuitry and stored in communicatively coupled memory circuitry; and
responsive to the determination that the link address data included in the first message corresponds to the stored link address data assigned to the control circuitry, determine if the fixture command data included in the first message corresponds to fixture preset command data stored in the memory circuitry;
responsive to the determination that the received fixture command data corresponds favorably to fixture preset command data stored in the memory circuitry:
retrieve a respective light-emitting diode (LED) driver preset command for each of a plurality of communicatively coupled LED driver circuits from the memory circuitry, the retrieved LED driver preset commands corresponding to the received fixture preset command data; and
cause a communication, via second communication interface circuitry, of a second message that includes the retrieved preset command data to respective ones of the plurality of communicatively coupled LED driver circuits.

8. The non-transitory, machine-readable, storage device of claim 7 wherein the instructions, when executed by the lighting fixture control circuitry, further cause the lighting fixture control circuitry to:
responsive to the determination that the received fixture command data does not correspond favorably to fixture preset command data stored in the memory circuitry:
cause a communication, via the second communication interface circuitry, of the received fixture command data to each respective one of the plurality of communicatively coupled LED driver circuits.

9. The non-transitory, machine-readable, storage device of claim 7 wherein the instructions that cause the lighting fixture control circuitry to retrieve the respective LED driver preset command for each of a plurality of communicatively coupled LED driver circuits from the memory circuitry, further cause the lighting device control circuitry to;
retrieve a respective light-emitting diode (LED) driver preset command for each of a plurality of communicatively coupled LED driver circuits from the memory circuitry, each of the plurality of LED driver circuits operatively coupled to a respective one of a plurality of different color LED emitters.

10. The non-transitory, machine-readable, storage device of claim 7 wherein the instructions that cause the lighting fixture control circuitry to cause the communication of the second message that includes the retrieved preset command data to respective ones of the plurality of communicatively coupled LED driver circuits further cause the lighting fixture control circuitry to:
cause a communication, via the second communication interface circuitry, of a second message that includes a plurality of sub-addresses to each of the plurality of LED driver circuits, each of the plurality of sub-addresses corresponding to a respective one of the plurality of LED driver circuits.

11. The non-transitory, machine-readable, storage device of claim 7 wherein the instructions that cause the lighting fixture control circuitry to receive the first message from the system controller, the first message including the link address data and the fixture command data further cause the lighting fixture control circuitry to:
receive, the via first communication interface circuitry, the first message from the system controller, the first message including the link address data and the fixture command data, wherein the fixture command data includes a color trajectory value of the composite light emitted by LEDs operatively coupled to the plurality of LED driver circuits.

12. The non-transitory, machine-readable, storage device of claim 11 wherein the instructions that cause the lighting fixture control circuitry to retrieve the respective LED driver preset command for each of the plurality of communicatively coupled LED driver circuits from the memory circuitry, further cause the lighting fixture control circuitry to:
retrieve a respective color trajectory value of the light emitted by the LEDs operatively coupled to each of the plurality of communicatively coupled LED driver circuits from the memory circuitry.

13. A method of controlling an output of a lighting fixture, the method comprising:
receiving, via first communication interface circuitry by lighting fixture control circuitry, a first message from a system controller, the first message including link address data and fixture command data;
determining, by the lighting fixture control circuitry, if the received link address data corresponds to link address data assigned to the control circuitry and stored in communicatively coupled memory circuitry; and
responsive to the determination that the link address data included in the first message corresponds to the stored link address data assigned to the control circuitry, determining, by the lighting fixture control circuitry, if the fixture command data included in the first message corresponds to fixture preset command data stored in the memory circuitry;
responsive to the determination that the received fixture command data corresponds favorably to fixture preset command data stored in the memory circuitry:
retrieving, by the lighting fixture control circuitry, a respective light-emitting diode (LED) driver preset command for each of a plurality of communicatively coupled LED driver circuits from the memory circuitry, the retrieved LED driver preset commands corresponding to the received fixture preset command data; and
causing, by the lighting fixture control circuitry, a communication of a second message that includes the retrieved preset command data to respective ones of the plurality of communicatively coupled LED driver circuits via second communication interface circuitry.

14. The method of claim 13, further comprising:
responsive to the determination that the received fixture command data does not correspond favorably to fixture preset command data stored in the memory circuitry:
causing, by the lighting fixture control circuitry, a communication of the received fixture command data to each respective one of the plurality of communicatively coupled LED driver circuits via the second communication interface circuitry.

15. The method of claim 13 wherein retrieving the respective light-emitting diode (LED) driver preset command for each of the plurality of communicatively coupled LED driver circuits from the memory circuitry further comprises;
retrieving the respective light-emitting diode (LED) driver preset command for each of the plurality of communicatively coupled LED driver circuits from the memory circuitry, each of the plurality of LED driver circuits operatively coupled to a respective one of a plurality of different color LED emitters.

16. The method of claim 13 wherein causing the communication of the second message that includes the retrieved preset command data to respective ones of the plurality of communicatively coupled LED driver circuits further comprises:
causing, by the lighting fixture control circuitry, a communication of the second message that includes a plurality of sub-addresses to each of the plurality of LED driver circuits, each of the plurality of sub-addresses corresponding to a respective one of the plurality of LED driver circuits via the second communication interface circuitry.

17. The method of claim 13 wherein receiving the first message from the system controller, the first message including the link address data and the fixture command data further comprises:
receiving, by the lighting fixture control circuitry, the first message from the system controller, the first message including the link address data and the fixture command data, wherein the fixture command data includes a color trajectory value of the composite light emitted by LEDs operatively coupled to the plurality of LED driver circuits via the first communication interface circuitry.

18. The method of claim 17 wherein retrieving the respective LED driver preset command for each of the plurality of communicatively coupled LED driver circuits from the memory circuitry further comprises:
retrieving, by the lighting fixture control circuitry, a respective color trajectory value of the light emitted by the LEDs operatively coupled to each of the plurality of communicatively coupled LED driver circuits from the memory circuitry.

* * * * *